(12) United States Patent
Song et al.

(10) Patent No.: US 10,104,433 B2
(45) Date of Patent: Oct. 16, 2018

(54) DISPLAY APPARATUS, BROADCAST SIGNAL RECEIVING APPARATUS AND CONTROL METHODS THEREOF

(71) Applicant: SAMSUNG ELECTRONICS CO., LTD., Suwon-si, Gyeonggi-do (KR)

(72) Inventors: Ji-hyun Song, Suwon-si (KR); Soo-hyang Kim, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/416,201

(22) Filed: Jan. 26, 2017

(65) Prior Publication Data

US 2017/0223412 A1 Aug. 3, 2017

(30) Foreign Application Priority Data

Feb. 1, 2016 (KR) .................. 10-2016-0012287

(51) Int. Cl.
*H04N 21/239* (2011.01)
*H04N 21/254* (2011.01)
(Continued)

(52) U.S. Cl.
CPC ..... *H04N 21/4627* (2013.01); *H04L 63/0428* (2013.01)

(58) Field of Classification Search
CPC .......... H04N 21/2396; H04N 21/2541; H04N 21/25816; H04N 21/26606; H04N 21/44204
(Continued)

(56) References Cited

U.S. PATENT DOCUMENTS 7,900,263 B2 * 3/2011 Yoshizawa ....... G11B 20/00086
380/201
2005/0097331 A1 5/2005 Majidimehr et al.
(Continued)

FOREIGN PATENT DOCUMENTS

WO 2007/072354 6/2007

OTHER PUBLICATIONS

Extended European Search Report dated Sep. 22, 2017 for EP Application No. 17153916.6.

*Primary Examiner* — Dominic D Saltarelli
(74) *Attorney, Agent, or Firm* — Nixon & Vanderhye, P.C.

(57) ABSTRACT

A display apparatus, a broadcast signal receiving apparatus and methods thereof are provided. The display apparatus includes a signal receiver configured to receive data of content, a display configured to display an image, an interface comprising interface circuitry configured to communicate with a security processing module, and a processor configured to transmit first data of the content to the security processing module in response to a recording event of the content, to receive and store second data and information of a security identifier of the content from the security processing module, and to display an image of the content to which the security identifier is added based on the stored second data and information in response to a play-back event to the content. Accordingly, if the content is recorded and then played back, the security identifier may be displayed in the played-back image of the content, thereby protecting the played-back content enough to prevent and/or reduce unauthorized use thereto.

14 Claims, 20 Drawing Sheets

(51) Int. Cl.
    *H04N 21/258*     (2011.01)
    *H04N 21/266*     (2011.01)
    *H04N 21/442*     (2011.01)
    *H04N 21/4627*     (2011.01)
    *H04L 29/06*     (2006.01)

(58) Field of Classification Search
    USPC .................................................. 725/25–31
    See application file for complete search history.

(56) References Cited

U.S. PATENT DOCUMENTS

| | | | |
|---|---|---|---|
| 2006/0075244 A1* | 4/2006 | Schumann | G06F 21/10 |
| | | | 713/176 |
| 2011/0170688 A1 | 7/2011 | Evans et al. | |
| 2014/0325673 A1* | 10/2014 | Petrovic | G06F 21/16 |
| | | | 726/27 |
| 2015/0208119 A1 | 7/2015 | Casagrande et al. | |

* cited by examiner

DISPLAY APPARATUS, BROADCAST SIGNAL RECEIVING APPARATUS AND CONTROL METHODS THEREOF

CROSS-REFERENCE TO RELATED APPLICATION

This application is based on and claims priority under 35 U.S.C. § 119 to Korean Patent Application No. 10-2016-0012287, filed on Feb. 1, 2016 in the Korean Intellectual Property Office, the disclosure of which is incorporated by reference herein in its entirety.

BACKGROUND

Field

The present disclosure relates generally to a display apparatus, a broadcast signal receiving apparatus and control methods thereof, and for example, to a display apparatus, a broadcast signal receiving apparatus and control methods thereof, which can carry out security processing to prevent and/or reduce unauthorized use of content.

Description of Related Art

A display apparatus, such as a television (TV), or a broadcast signal receiving apparatus (hereinafter, commonly called "display apparatus" except when there are other special explanations), such as a set-top box, receives a broadcast signal including data of content, extracts the data of the content from the received broadcast signal, and displays an image of the content based on the extracted data.

The content may be, for example, pay content. In this case, to allow only paid users with access authority to use the content, protective treatment (hereinafter, also referred to "security processing"), such as scrambling or the like, for preventing unauthorized use may have been carried out to the content, which is contained in the received broadcast signal. The display apparatus may check the access authority of the user to the received content and then carry out security disabling processing, such as descrambling or the like, to the data of the content to which security is applied, thereby enabling the user to use the content.

To carry out such a security processing or security disabling processing, there are known technologies, which use a separate module (hereinafter, referred to "security processing module") different from the display apparatus. The user may purchase the security processing module to obtain the access authority of the content. The security processing module is mounted in the display apparatus. If the broadcast signal is received, the display apparatus extracts the data of the content to which security is applied, from the broadcast signal, and transmits the extracted data of the content to the security processing module. The security processing module checks access authority of the user to the content, disables the security to the content, and then retransmits the content to which the security is disabled, to the display apparatus.

On the other hand, unauthorized use of content displayed on the display apparatus may also occur. As a type of such an unauthorized use, there is a case of using or distributing reproduction content, which is obtained by recording or photographing an image of the content displayed on the display apparatus with an imaging apparatus, such as a camcorder or the like, in unauthorized ways. To prevent such an unauthorized use, the display apparatus displays a security identifier, such as a fingerprint or the like, along with the image of the content, thereby enabling the display apparatus, the security processing module and the like used in illegal reproduction to be traced via the security identifier displayed in the image of the illegally reproduced content.

However, according to related technologies, there was a problem in that if the content is recorded and then played back, the security identifier is not properly displayed on the image of the content, which is played-back, thereby not protecting the played-back content enough to prevent unauthorized use thereto.

SUMMARY

Example embodiments address at least the above problems and/or disadvantages and other disadvantages not described above.

The example embodiments may provide a display apparatus, a broadcast signal receiving apparatus and control methods thereof, which if content is recorded and then played back, can display a security identifier on a played-back image of the content.

According to an example aspect of an example embodiment, a display apparatus is provided, including a signal receiver configured to receive data including content; a display configured to display an image; an interface comprising interface circuitry configured to communicate with a security processor configured to determine whether to enable access to the content; and a processor configured: to transmit first data of the content to the security processor in response to a recording event of the content; to receive second data and information of a security identifier of the content from the security processor; to store the received second data and information of the security identifier of the content; and to display an image of the content to which a security identifier is added based on the stored second data and information of the security identifier of the content, in response to a play-back event of the content.

The signal receiver may be configured to receive a broadcast signal including the data of the content, and the processor may be configured to extract the first data of the content from the broadcast signal.

The processor may be configured to transmit the information of the security identifier to a server, and to receive the information of the security identifier from the server and to add the security identifier to the image of the content based on the received information of the security identifier, in response to the play-back event of the content.

The processor may be configured to encode the information of the security identifier and to transmit the encoded information of the security identifier to the server.

The processor may be configured to further store synchronization information between the content and the security identifier and to synchronize the security identifier with the image of the content based the stored synchronization information.

According to an aspect of another example embodiment, method of controlling a display apparatus is provided, including receiving data of content; transmitting first data of the content to the security processing module, which determines whether to enable access to the content, in response to a recording event of the content; receiving second data and information of the security identifier of the content from the security processing module; storing the received second data and information of the security identifier of the content; and displaying an image of the content to which a security identifier is added based on the stored second data and information of the security identifier of the content, in response to a play-back event of the content.

The receiving the data of the content may include receiving a broadcast signal including the data of the content, and the transmitting may include extracting the first data of the content from the broadcast signal and transmitting the extracted first data of the content to the security processing module.

The storing may include transmitting the information of the security identifier to a server, and the displaying may include receiving the information of the security identifier from the server and adding the security identifier to the image of content based on the received information of the security identifier.

The transmitting the information of the security identifier may include encoding the information of the security identifier and transmitting the encoded information of the security identifier to the server.

The method may include further storing synchronization information between the content and the security identifier, and the displaying may include synchronizing the security identifier with the image of the content based the stored synchronization information.

According to an example aspect of further another example embodiment, a display apparatus is provided, including a signal receiver configured to receive data of content; a display configured to display an image; an interface comprising circuitry configured to communicate with a security processing module comprising a security processor, the security processor configured to determine whether to enable access to the content; and a processor configured to transmit first data of the content to the security processing module in response to a recording event of the content; to receive second data of the content from the security processing module and to store the received second data of the content; to receive information of a security identifier with respect to the content from the security processing module in response to a play-back event of the content; and to display an image of the content to which a security identifier is added based on the stored second data of the content and the received information of the security identifier.

The signal receiver may be configured to receive a broadcast signal including the data of the contents, and the processor may be configured to extract the first data of the content from the broadcast signal.

The processor may be configured to synchronize the security identifier with the image of the content based synchronization information between the content and the security identifier.

The processor may be configured to receive the synchronization information from the security processing module.

According to an example aspect of further example embodiment, method of controlling a display apparatus is provided, including receiving data of content; transmitting first data of the content to a security processing module, which determines whether to enable access to the content, in response to a recording event to the content; receiving second data of the content from the security processing module; storing the received second data of the content; receiving information of a security identifier with respect to the content from the security processing module in response to a play-back event of the content; and displaying an image of the content to which a security identifier is added based on the stored second data of the content and the received information of the security identifier.

The receiving the data of the content may include receiving a broadcast signal including the data of the content, and the transmitting may include extracting the first data of the content from the broadcast signal and transmitting the extracted first data of the content to security processing module.

The displaying may include synchronizing the security identifier with the image of the content based synchronization information between the content and the security identifier.

The displaying may further include receiving the synchronization information from the security processing module.

As described above, according to various example embodiments, if the content is recorded and then played back, the security identifier may be displayed on the played-back image of the content, thereby protecting the played-back content enough to prevent and/or reduce unauthorized use thereto.

BRIEF DESCRIPTION OF THE DRAWINGS

The above and other aspects, features, and attendant advantages of the present disclosure will be more apparent and readily appreciated from the following description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1:
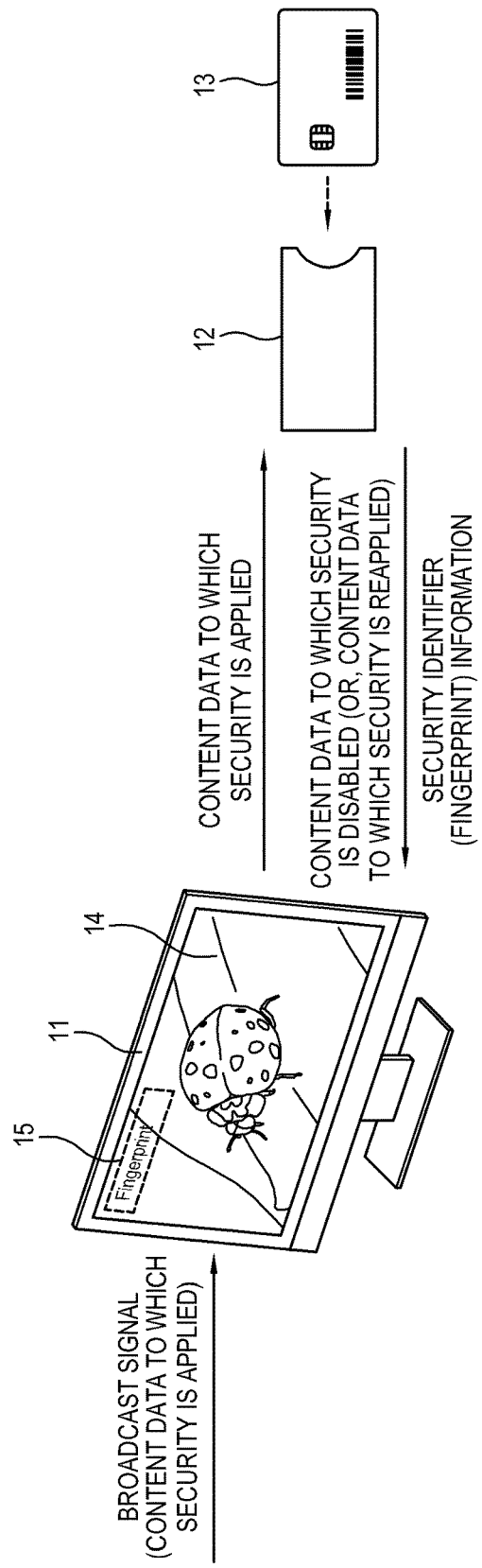
FIG. 1 is a diagram illustrating an example display apparatus according to an example embodiment.

Hereinafter, various example embodiments will be described in greater detail. FIG. 1 is a diagram illustrating an example display apparatus according to an example embodiment. The example embodiment as illustrated in FIG. 1 is applied to a display apparatus 11, such as a television (TV), but is not limited thereto. For instance, the example embodiment may be also applied to a broadcast signal receiving apparatus, such as a set-top box, as well as the display apparatus 11. Hereinafter explanations of the display apparatus 11 according to the example embodiment may be also applied to the broadcast signal receiving apparatus as long as there are no other explanations thereon.

As illustrated in FIG. 1, the display apparatus 11 according to an example embodiment receives a broadcast signal and displays an image 14 based on the received broadcast signal. The broadcast signal according to an example embodiment may be a broadcast signal for digital television. For example, the broadcast signal according to an example embodiment may be a signal that conforms to standard of, for example, at least one or a portion from among digital video broadcasting (DVB), advanced television system committee (ATSC), integrated services digital broadcasting (ISDB), digital terrestrial multimedia broadcasting (DTMB) and digital multimedia broadcasting (DMB). However, the above-described standard is merely an example, and the broadcast signal according to an example embodiment may be signals that conform to other standards, which are not described above. Also, the broadcast signal according to an example embodiment includes at least one of a terrestrial broadcast signal, satellite broadcast signal, a cable broadcast signal and a mobile broadcast signal.

The broadcast signal, according to an example embodiment includes data of content. The content according to an example embodiment includes video data for displaying an image. The content according to an example embodiment may further include at least one of audio data for outputting sound and additional information data for providing additional information, besides the video data. The content according to an example embodiment is not limited in type and includes, for example, movie, drama, music, news, sport, entertainment, education, business, documentary, etc.

Security processing for preventing and/or reducing unauthorized use is applied to the content contained in the broadcast signal according to an example embodiment. The data of the content contained in the broadcast signal according to an example embodiment may be data encrypted on the basis of a so-called "conditional access system (CAS)". For instance, if the broadcast signal conforms to the DVB standard, the data of the content may be encrypted according to standards of DVB-conditional access (CA), DVB-common scrambling algorithm (CSA) and DVB-common interface (CI). However, the security processing for the data of the content according to an example embodiment is not limited to the processing on the basis of a specific system, such as the CAS, and may include various types of processing, which cannot properly use the content without disabling security.

A security processing module (e.g., including a security processor, security processing circuitry, etc.) 12 for disabling the security of the content may be connected to the display apparatus 11 according to an example embodiment. The security processing module 12 may be provided as a device separate from the display apparatus 11. The security processing module 12 may be implemented as a so-called "conditional access module (CAM)" based on CAS. However, the security processing module 12 according to an example embodiment is not limited to a specific module, such as the CAS, and may include various types of modules, which can disable the security of the content.

The display apparatus 11, according to an example embodiment, extracts the data of the content to which the security processing is applied, from the received broadcast signal and transmits the extracted data of the content to the security processing module 12. The security processing module 12 may include various security processing circuitry, including, for example, and without limitation a security processor that checks access authority of a user to the received content. If the user has the access authority, the security processing module 12 performs processing, which disables the security of the content. For instance, the security processing module 12 may descramble scrambled data of the content based on the CAS. The security processing module 12 retransmits the data of the content to which security is disabled to the display apparatus 11. As an example embodiment, to increase the security to the content, the security processing module 12 may encrypt descrambled data of the content again and transmit the encrypted data of the content to the display apparatus 11.

In an example embodiment, a subsidiary module 13 may be further used to carry out the security processing to the content. The subsidiary module 13 may include additional circuitry and be connected to the security processing module 12 and provide information on access authority of the user to the security processing module 12. The subsidiary module 13 may be implemented in a type of device, such as, for example, and without limitation, a so-called "smart card", which is provided with an integrated circuit in which the information on access authority of the user is contained. The security processing module 12 may disable the security of the content, based on the information on access authority of the user provided from the subsidiary module 13.

Also, to prevent and/or reduce unauthorized use to displayed content, the security processing module 12 generates information on security identifier of the content and transmits the generated information on security identifier to the display apparatus 11. The information on security identifier is information for displaying a security identifier 15 along with the image 14 of the content if the content is displayed at the display apparatus 11. If the displayed content is illegally copied or reproduced, the security identifier 15 may be used to trace devices, users and so on related to the illegal copy or reproduction. The information on security identifier may include identification information of the display apparatus 11 and/or the security processing module 12, identification information of the content, and information about times, places and so on that the content is displayed. Format or content of the information of the security identifier according to an example embodiment may conform to standard of, for example, DVB-CI or DVB-CI+, or the like, but is not limited thereto.

The display apparatus 11 receives the data of the content in which the security is disabled and the information on security identifier thereof from the security processing module 12 and displays the image 14 of the content to which the security identifier 15 is added, based on the received data and information on security identifier of the content. If receiving re-encrypted data of the content from the security processing module 12, the display apparatus 11 may decrypt the re-encrypted data of the content to display the image 14 of the content. The security identifier 15 may be displayed in a type or form of letters or images. The type of the security identifier 15 as illustrated in FIG. 1 is merely an example and is not limited thereto.

The display apparatus 11 according to an example embodiment displays the image 14 of the content to which the security identifier 15 is added if the content of the broadcast signal is not only received and displayed in real time, but also recorded and then played back. Accordingly, the display apparatus 11 according to an example embodiment can protect the played-back content enough to prevent and/or reduce unauthorized use.

Figure 2:
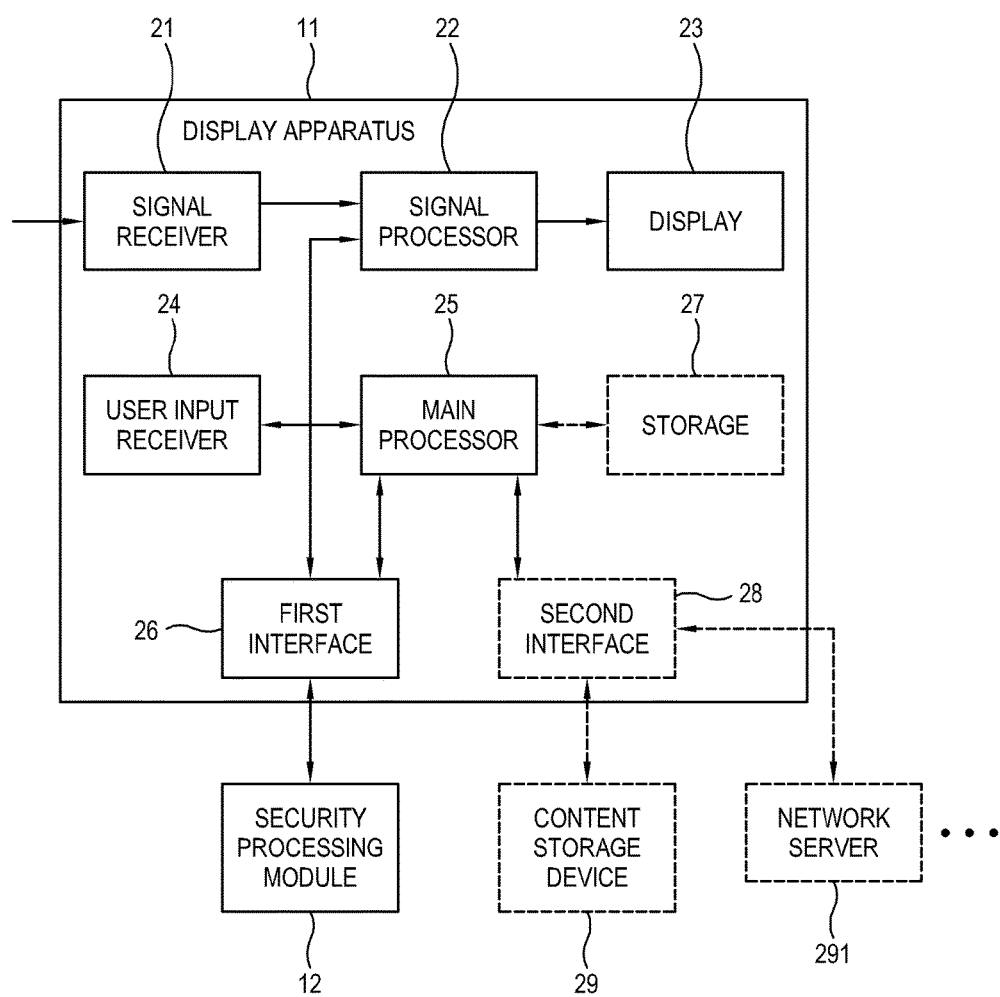
FIG. 2 is a block diagram illustrating an example configuration of a display apparatus according to an example embodiment.

FIG. 2 is a block diagram illustrating an example configuration of a display apparatus 11 according to an example embodiment. As illustrated in FIG. 2, the display apparatus 11 according to an example embodiment may include a signal receiver 21, a signal processor (e.g., including processing circuitry) 22, a display 23, a user input receiver 24, a first interface (e.g., including interface circuitry) 26 and a main processor (e.g., including processing circuitry) 25. The signal receiver 21 may include various circuitry that receives a broadcast signal including data of content. The signal receiver 21 receives a broadcast signal of any one from among a plurality of channels to receive the data of the content. The content may be provided in the form of a broadcast program by a content provider for a corresponding channel. To receive the broadcast signal of the corresponding channel, the user may select a channel that she or he wants to watch from among the plurality of channels.

The signal processor 22 may include various circuitry that processes the broadcast signal received by the signal receiver 21. The signal processor 22 processes the broadcast signal to extract the data of the content, and performs processing for displaying an image based on the extracted data of the content. Also, the signal processor 22 may further perform processing for outputting audio or additional information if the content includes the audio or the additional information, besides video. Greater details of the signal processor 22 will be described below.

The display 23 displays an image of the content based on the data processed by the signal processor 22. The display may display the image in various type of display methods, which include a liquid crystal display (LCD), an organic light-emitting diode (OLED), a projection, a plasma display panel (PDP), or the like, but is not limited thereto.

The user input receiver 24 may include various receiving circuitry that receives a user input about a control of the display apparatus 11. The user input receiver 24 may include, for example, and without limitation a panel input unit including input circuitry and/or a remote control receiver, which are provided in a main body of the display apparatus 11. The panel input unit includes circuitry that directly receives the user input and the remote control receiver receives a remote control signal including information on the user input from a remote controller, which receives the user input.

The first interface 26 may include various interface circuitry that interfaces between the display apparatus 11 and the security processing module 12. The first interface 26 may include a module receiving part, which has shape and structure, for example, for mounting or dismounting the security processing module 12 on or from the display apparatus 11. To enable communication between the display apparatus 11 and the security processing module 12, the first interface 26 may include a connector, which includes a plurality of signal transmitting pins and which is connected with a counterpart connector of the security processing module 12. As another example embodiment, the first interface 26 may further include a wireless communicator (e.g., including wireless communication circuitry), which enables wireless communication between the display apparatus 11 and the security processing module 12. Construction on the communication of the first interface 26 may conform to standard of, for example, DVB-CI or DVB-CI+, or the like, but is not limited thereto.

The main controller 25 may include various processing circuitry that performs a general control of the display apparatus 11. For example, the main processor 25 transmits data of the content (first data of the content) to which security is applied, to the security processing module 12, in response to a recording event of the content, receives data of the content (second data of the content) to which the security is disabled or re-applied and information of the security identifier of the content, from the security processing module 12, stores the received second data and information of the security identifier of the content, and displays an image of the content to which a security identifier is added based on the stored second data and information on security identifier of the content, in response to a play-back event of the content. To this end, the main processor 25 controls the signal receiver 21, the signal processor 22, the display 23, the user input receiver 24, and the first interface 26. The recording event of the content according to an example embodiment may include a recording command provided by the user input, or performing a reserved recording according to a reserved recording command by the user input. The play-back event to the content according to an example embodiment may include a play-back command by the user input to the recorded content.

The main controller 25 may include, for example, and without limitation, a control program for performing the above described control operations, a nonvolatile memory in which the control program is installed, a volatile memory in which at least a portion of the control program is loaded, and at least one microprocessor for executing the loaded control program. The control program may include a program(s), which is implemented in the form of at least one from among a BIOS, a device driver, an operating system, a firmware, a platform, and an application program (or application). As an example embodiment, the application program may be installed or stored in advance in the display apparatus 11 in manufacture, or installed based on data of the application program received from the outside in use. The data of the application program may be downloaded from an external server, such as an application market, to the display apparatus 11.

In an example embodiment, if at least a portion of each of the signal receiver 22 and the main processor 25 is implemented by a software, a plurality of programs, which is implemented by the software, may be executed by a single common microprocessor.

The configuration of the display apparatus 11 according to an example embodiment as illustrated in FIG. 2 is merely an example and the display apparatus 11 according to an example embodiment may be implemented in different configurations from the configuration illustrated in FIG. 2. In other words, the display apparatus 11 according to an example embodiment may be implemented by adding other components to the configuration illustrated in FIG. 2 or removing at least one component from among the configuration illustrated in FIG. 2.

Figure 3:
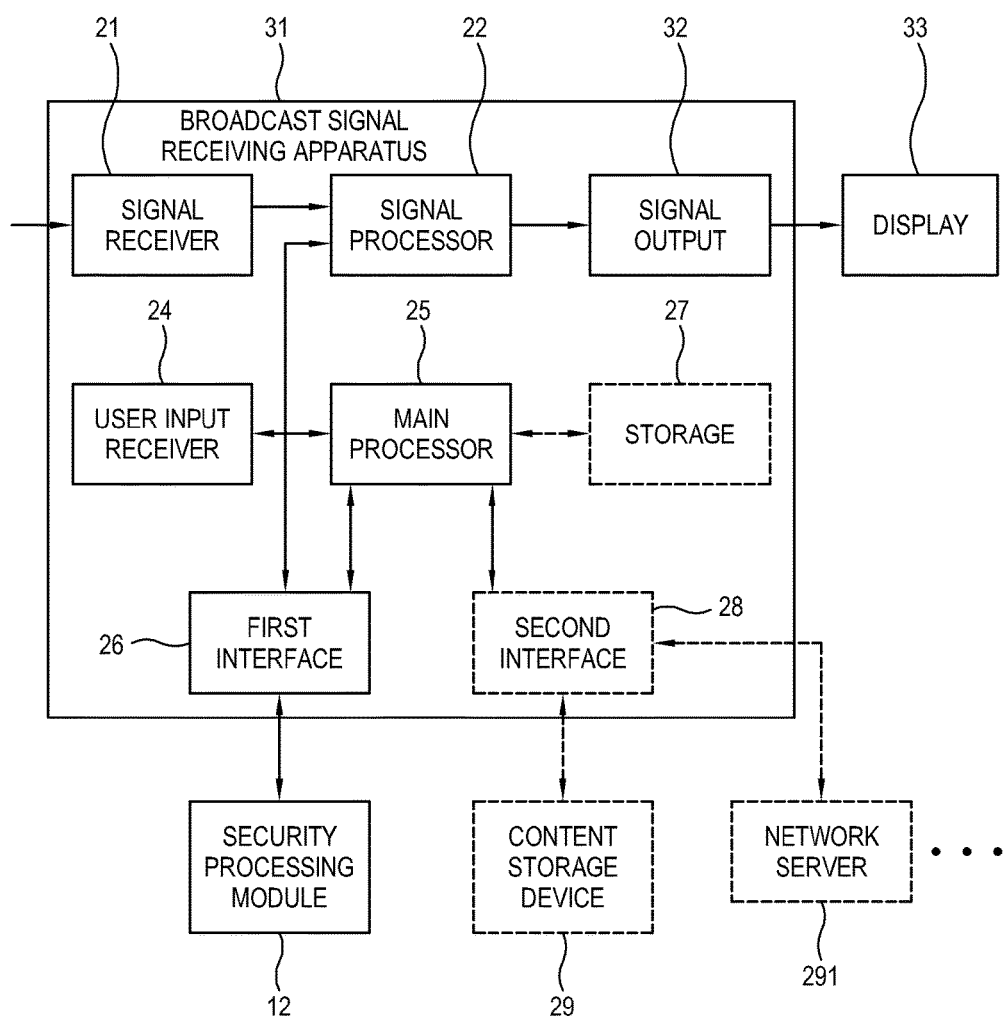
FIG. 3 is a block diagram illustrating an example configuration of a broadcast signal receiving apparatus according to an example embodiment.

FIG. 3 is a block diagram illustrating an example configuration of a broadcast signal receiving apparatus 31 according to an example embodiment. In the broadcast signal receiving apparatus 31 illustrated in FIG. 3, explanations of various components thereof, which are the same or similar to those of the display apparatus 11 illustrated in FIG. 1, will be omitted. As illustrated in FIG. 3, the broadcast signal receiving apparatus 31 according to an example embodiment may include a signal receiver 21, a signal processor 22, a signal output 32, a user input receiver 24, a first interface 26 and a main processor 25. The signal output 32 of the broadcast signal receiving apparatus 31 may include various output circuitry that transmits an output signal, which includes data of content and security identifier processed by the signal processor 22, to an external display apparatus 33. The method of which the signal output 32 transmits an output signal to the display apparatus 33 is not limited and may include wired or wireless transmission. The display apparatus 33 displays an image of the content to which the security identifier is added, based on the data of the content and the security identifier received from the signal output 32 of the broadcast signal receiving apparatus 31.

Figure 4:
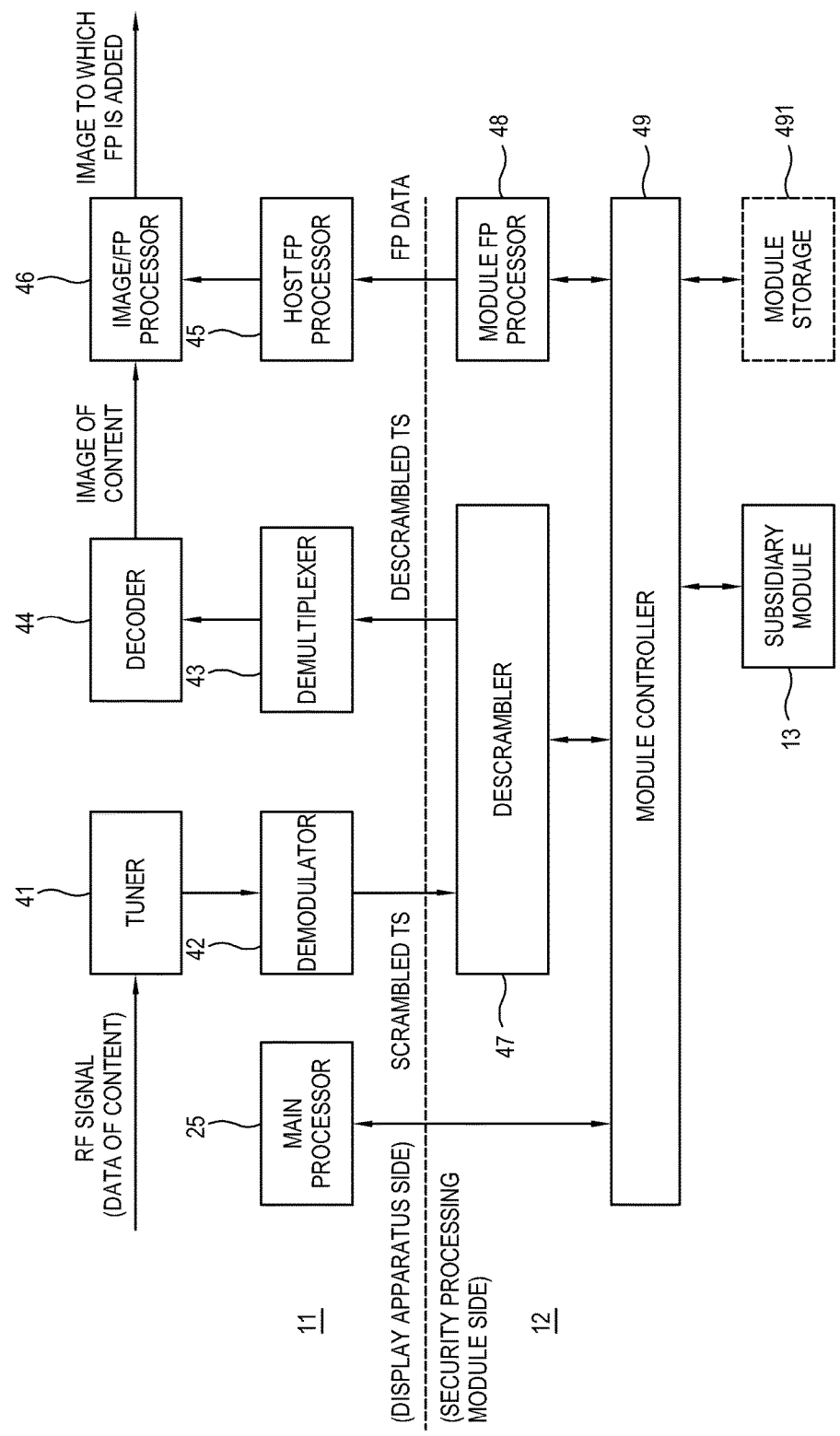
FIG. 4 is a block diagram illustrating an example configuration of a display apparatus and a security processing module according to an example embodiment.
Figure 5:
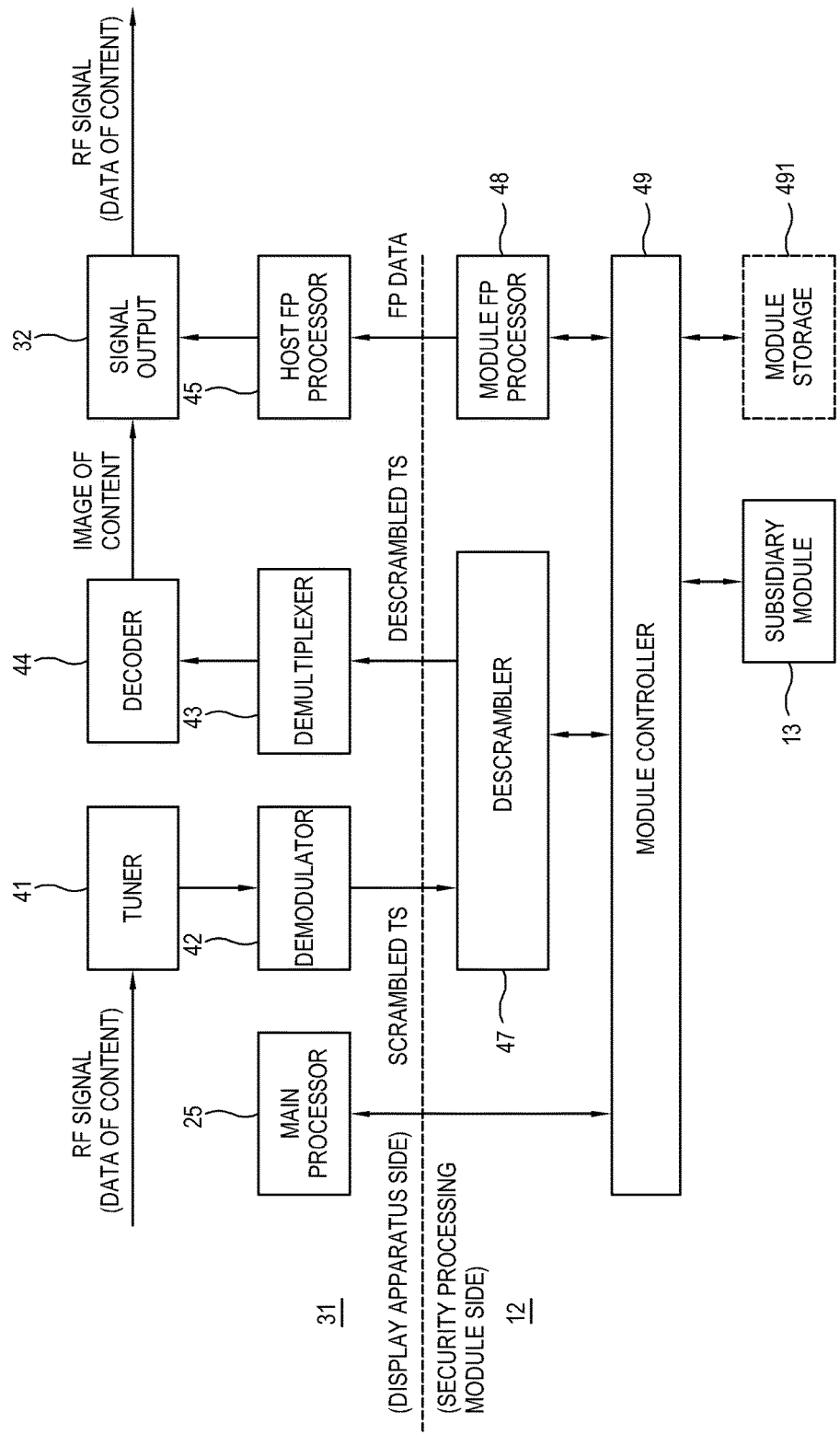
FIG. 5 is a block diagram illustrating an example configuration of a broadcast signal receiving apparatus and a security processing module according to an example embodiment.

FIG. 4 is a block diagram illustrating an example configuration of a display apparatus 11 and a security processing module 12 according to an example embodiment. The configuration of the display apparatus 11 and the security processing module 12 as illustrated in FIG. 4 is merely an example and the display apparatus 11 and the security processing module 12 according to an example embodiment is not limited thereto. A tuner 41 as illustrated in FIG. 4 may be included in the signal receiver 21 as illustrated in FIG. 2. A demodulator 42, a demultiplexer 43, a decoder 44, a host fingerprint (FP) processor 45 and an image/FP processor 46, which are illustrated in FIG. 4, may be included in the signal processor 22 as illustrated in FIG. 2. The security processing module 12 may include a descrambler 47, a module FP processor 48 and a module controller 49. Even though for the sake of convenient explanation, there is not illustrated, the main processor 25, the demodulator 42, the demultiplexer 43 and the host FP processor 45 of the display apparatus 11 may communicate with or be coupled to the descrambler 47, the module FP processor 48 and the module controller 49 of the security processing module 12 via the first interface 26 as illustrated in FIG. 2. The demodulator 42, the demultiplexer 43, the decoder 44, the host FP processor 45 and the image/FP processor 46 of the display apparatus 11 and the descrambler 47, the module FP processor 48 and the module controller 49 of the security processing module 12, which are illustrated in FIG. 5, may implemented by a hardware or software, or a combination of the hardware and the software, respectively.

The tuner 41 tunes and receives a broadcast signal of any one channel selected by a user input from among a plurality of channels under a control of the main processor 25. The broadcast signal may be, for example, a radio frequency (RF) signal. As an example embodiment, the tuner 41 may perform, for example, and without limitation, at least one of noise cancelling, FR-intermediate frequency (IF) conversion, channel selection filtering, amplifying, IF-baseband conversion, analogue to digital conversion and digital to analogue conversion with respect to the received RF signal. As a result of the tuning as described above, the tuner 41 outputs a baseband signal.

In the baseband signal output by the tuner 41, content of a selected channel, that is, data of a broadcast program is contained in a format that conforms to a specific demodulation method. The demodulator 42 demodulates the baseband signal output by the tuner 41 according a demodulation method corresponding to the specific demodulation method to extract the data of the broadcast program from the baseband signal. The format of the extracted data of the broadcast program may be, for example, a transport stream (TS), but is not limited thereto.

As described above, the security processing for protecting the content is applied to the extracted content of the broadcast program. For instance, if the broadcast signal conforms the DVB standard, the content of the broadcast program may be a scrambled TS according to a format defined in DVB-CA, DVB-CSA and DVB-CI. The scrambled TS output by the demodulator 42 is transmitted to the descrambler 47 of the security processing module 12.

To disable security to the scrambled TS transmitted to the security processing module 12, the main processor 25 may transmit a request, respond to a request from the security processing module 12, or transmit and receive required information to and from the security processing module 12 while communicating with the module controller 49 of the security processing module 12.

The descrambler 47 of the security processing module 12 descrambles the scrambled TS transmitted from the demodulator 42 of the display apparatus 11 under control of the module controller 49. The module controller 49 checks access authority of the user to the scrambled TS transmitted from the display apparatus 11, and if the user has the access authority, controls the descrambler 47 to descramble the scrambled TS.

For example, the scrambled TS may be a TS scrambled by a preset secret key referred to as a "control word". Also, to increase security in transmission, the control word may be encrypted, for example, by an entitlement control message (ECM). The module controller 49 may check the access authority of the user to the scrambled TS, for example, based on authority information, such as an entitlement management message (EMM). The module controller 49 may check whether the user has the access authority to the scrambled TS via a communication with a subsidiary module 13, such as a so-called "smart card". If the user has the access authority to the scrambled TS, the module controller 49 decrypts a control word used in the scrambled TS and transmits the decrypted control word to the descrambler 47. The descrambler 47 descrambles the scrambled TS based on the transmitted control word and outputs the descrambled TS.

The descrambled TS includes video data of a broadcast program for a selected channel. Also, the descrambled TS may further include audio data and/or additional information data of the broadcast program, besides the video data. The demultiplexer 43 of the display apparatus 11 demultiplexes the descrambled TS output from the descrambler 47 of the security processing module 12 to separate the descrambled TS into the video data, the audio data and/or the additional information data.

The video data and the like output from the demultiplexer 43 are in a state, which is encoded in a preset encoding method. The decoder 44 decodes the video data, the audio data and/or the additional information data output from the demultiplexer 43 in a decoding method corresponding to the preset encoding method. The decoder 44 may perform decoding that conforms, for example, to MPEG2 standard.

As an additional example embodiment, to increase the security, the security processing module 12 may further include an encryptor, which re-encrypts the descrambled TS output by the descrambler 47 in a preset method. In this case, the signal receiver 22 of the display apparatus 11 may further include a decryptor, which decrypts the re-encrypted TS output by the encryptor of the security processing module 12. The demultiplexer 43 of the display apparatus 11 may demultiplex the descrambled TS output by the decryptor.

The module FP processor 48 generates information on security identifier (hereinafter, referred to "fingerprint data" or "FP data") to transmit to the display apparatus 11 under control of the module controller 49. The module FP processor 48 generates the fingerprint data based on information provided from the module controller 49. The fingerprint data may include identification information, such as a device ID of the display apparatus 11 or the security processing module 12, identification information on channel or broadcast program being processed, and information on processing time, place that the display apparatus 11 is located and the like. To generate the fingerprint data, the main controller 25, the module controller 291 and the subsidiary module 13 may transmit and receive required information while communicating with one another. As an additional example embodiment, to increase the security, the module FP processor 48 may encode or encrypt the fingerprint data in a preset method and output the encoded or encrypted fingerprint data.

Under control of the main processor 25, the host FP processor 45 of the display apparatus 11 receives the fingerprint data output by the module FP processor 48 of the security processing module 12 and based on the received fingerprint data, outputs a security identifier (hereinafter, referred to "fingerprint" or "FP") to the image/FP processor 46 to display on an image of the broadcast program. As an additional example embodiment, the host FP processor 45 may convert the fingerprint data received from the module FP processor 48 to correspond to a processing format of the image/FP processor 46. As an additional example embodiment, if the fingerprint data received from the module FP processor 48 has been encoded or encrypted, the host FP processor 45 may decode or decrypt the encoded or encrypted fingerprint data and output the decoded or decrypted fingerprint data.

The image/FP processor 46 generates an image of the broadcast program on which the fingerprint is added based on the decoded video data output from the decoder 44 and the fingerprint data output from the host FP processor 45. The image/FP processor 46 may generate the image of the broadcast program in frame unit, and include at least one frame memory, which stores video data corresponding to frames which are processing. The image/FP processor 46 may further include a scaler, which adjusts the image of the broadcast program in size to comply with a screen of the display 23. The image/FP processor 46 outputs data of the image of the broadcast program to which the fingerprint is added, which is generated as described above, to the display 23. The display 23 displays the image of the broadcast program to which the fingerprint is added, based on the data output from the image/FP processor 46.

FIG. 5 is a block diagram illustrating an example configuration of a broadcast signal receiving apparatus 31 and a security processing module 12 according to an example embodiment. In the broadcast signal receiving apparatus 31 illustrated in FIG. 5, explanations on constructions thereof, which are the same as or similar to those of the display apparatus 11 illustrated in FIG. 4, will be omitted. A tuner 41 as illustrated in FIG. 5 may be included in the signal receiver 21 as illustrated in FIG. 3. A demodulator 42, a demultiplexer 43, a decoder 44, and a host FP processor 45, which are illustrated in FIG. 5, may be included in the signal processor 22 as illustrated in FIG. 3. As illustrated in FIG. 5, a signal output 32 of the broadcast signal receiving apparatus 31 according to an example embodiment outputs an output signal, which includes decoded video data output from the decoder 44 and fingerprint data output from the host FP processor 45, to an external display apparatus 33.

Figure 6:
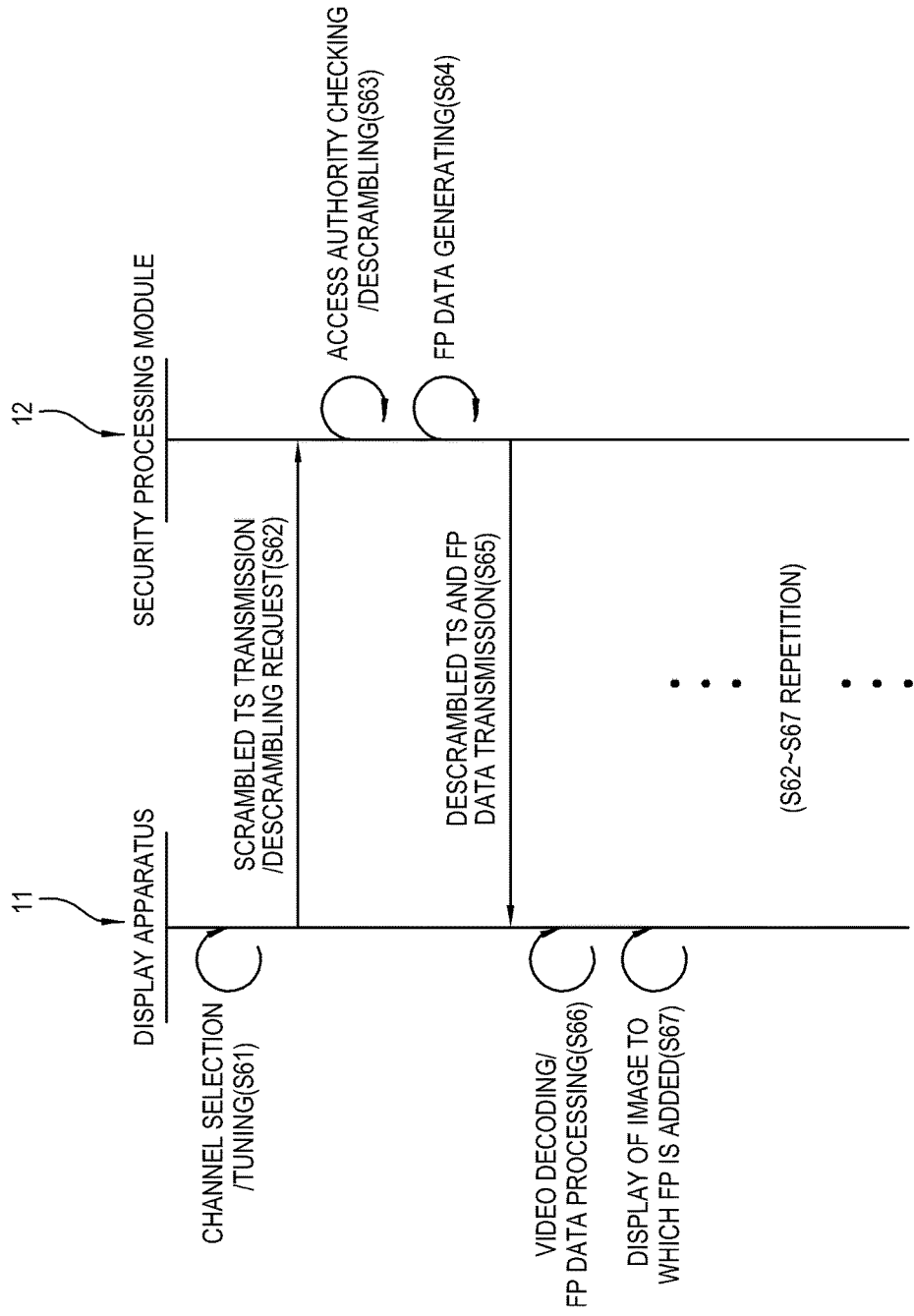
FIG. 6 is a flow diagram illustrating an example operation of a display apparatus and a security processing module according to an example embodiment.

FIG. 6 is a flow diagram illustrating an example operation of a display apparatus 11 and a security processing module 12 according to an example embodiment. The operation of the display apparatus 11 and the security processing module 12 illustrated in FIG. 6 is an example of displaying content included in a broadcast signal, which is received in real time. At operation S61, the display apparatus 11 receives a user input, which selects any one from among a plurality of channels, via the user input receiver 24. The main processor 25 of the display apparatus 11 controls the signal receiver 21 to receive the broadcast signal and to tune the channel selected based on the user input. Also, the main processor 25 controls the signal processor 22 to extract the content, that is, data of a broadcast program (scrambled TS) from the broadcast signal of tuned channel. At operation S62, the main processor 25 controls the display apparatus 11 to transmit the scrambled TS of the broadcast program to the security processing module 12 and requests the security processing module 12 to descramble the scrambled TS transmitted to the security processing module 12.

At operation S63, the security processing module 12 checks whether a user has access authority to the scrambled TS of the broadcast program in response to the request from the display apparatus 11, and if the user has the access authority, descrambles the scrambled TS. At operation S64, the security processing module 12 generates fingerprint data of the broadcast program based on identification information on the display apparatus 11, the security processing module 12 and/or the received broadcast program. At operation S65, the security processing module 12 transmits the descrambled TS and the generated fingerprint data of the broadcast program to the display apparatus 11.

At operation S66, the main processor 25 of the display apparatus 11 controls the signal processor 22 to separate video data from the descrambled TS of the broadcast program and to decode the video data of the broadcast program. If the broadcast program includes audio and/or additional information, the signal processor 22 may additionally separate audio data and/or additional information data from the descrambled TS of the broadcast program and decode the audio data and/or the additional information data of the broadcast program. Also, the main processor 25 controls the signal processor 22 to receive and process the fingerprint data of the broadcast program being decoded, from the security processing module 12. At operation S67, the main processor 25 controls the signal processor 22 generates an image of the broadcast program to which the fingerprint is added, based on the decoded video data and the processed fingerprint data. Also, the main processor 25 controls the display 23 to display thereon the image of the broadcast program to which the fingerprint is added, which is generated by the signal processor 22.

The security processing module 12 repeatedly performs the operations S62 to S67 until another event, such as a change in channel according to a user input, occurs.

Figure 7:
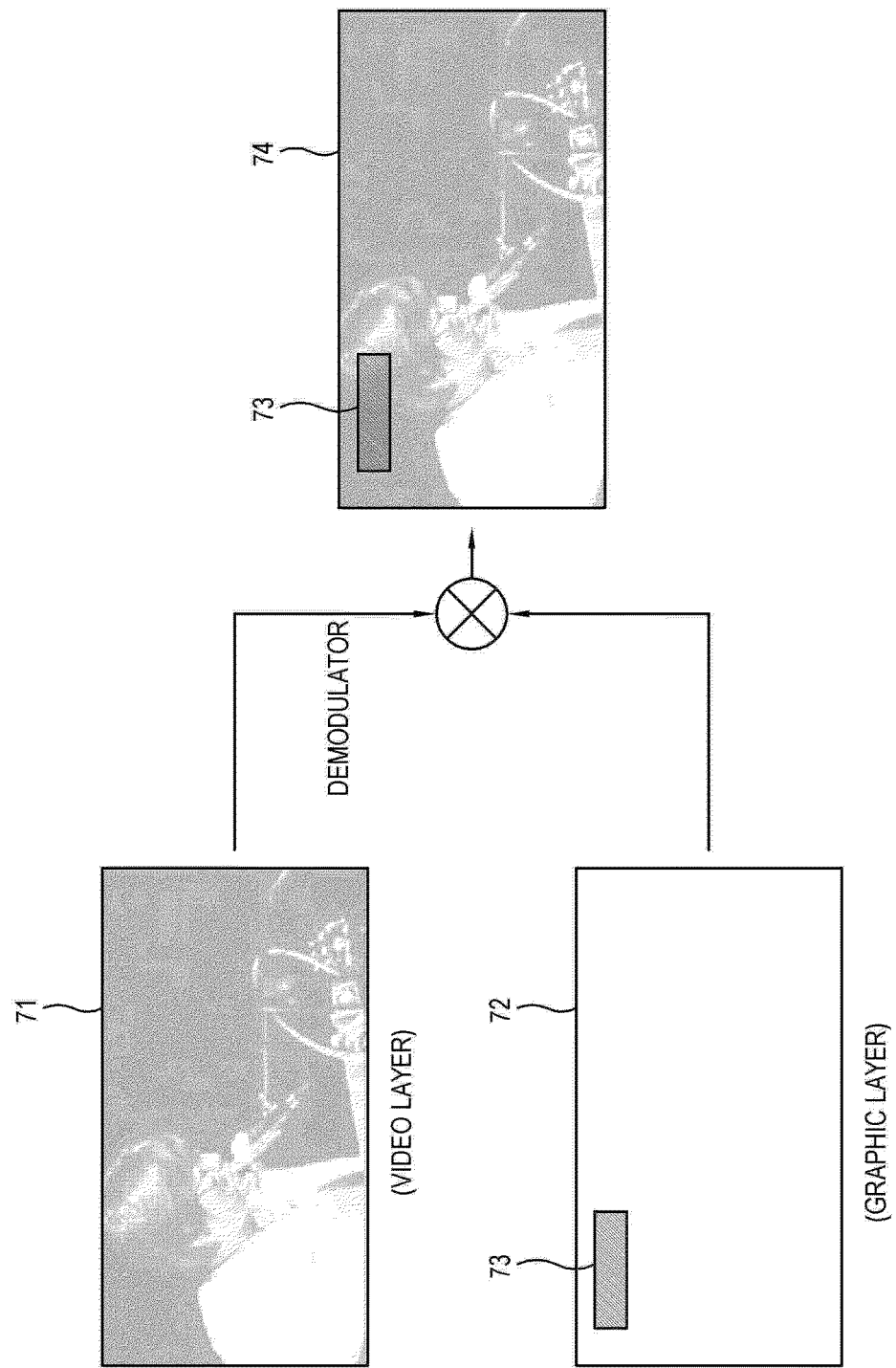
FIG. 7 is a diagram illustrating an example of a process of adding a fingerprint onto an image of a broadcast program by a display apparatus according to an example embodiment.

FIG. 7 is a diagram illustrating an example of adding a fingerprint to an image of a broadcast program by a display apparatus 11 according to an example embodiment. As illustrated in FIG. 7, the image/FP processor 46 of the display apparatus 11 may form an image and a finger print 73, in different layers, respectively. For instance, the image/FP processor 46 may generate a video layer 71 based on decoded video data to the image of the broadcast program and a graphic layer 72 based on fingerprint data to the finger print 73 of the broadcast program. The image/FP processor 46 may overlap the video layer 71 and the graphic layer 73 to generate an image 74 of the broadcast program on which the finger print 73 is added.

Figure 8:
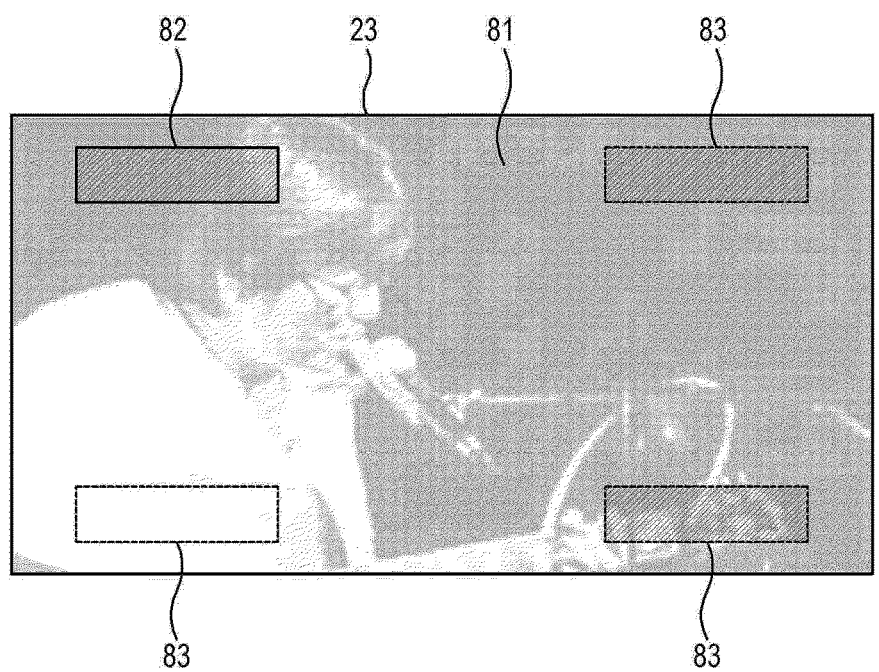
FIG. 8 is a diagram illustrating an example of an image of a broadcast program onto which a fingerprint is added, displayed by a display apparatus according to an example embodiment.

FIG. 8 is a diagram illustrating an example image of a broadcast program to which a fingerprint is added, displayed by a display apparatus 11 according to an example embodiment. The display 23 of the display apparatus 11 displays an image 81 of the broadcast program to which a fingerprint 82 is added, based on data output from the signal processor 22. The type of the fingerprint 82 as illustrated in FIG. 8 are merely an example and is not limited thereto. In other words, letters and image(s) presented in the fingerprint 82, shape, size, color, displaying position, display timing and the like of the fingerprint 82 are based on fingerprint data received from the security processing module 12 and may be variously set according to an object for preventing unauthorized use to displayed broadcast program. As an example embodiment, the display timing of the fingerprint 82 may be changed to other positions 83 while the image 81 of the broadcast program is displayed. As another example embodiment, the letters and images presented in the fingerprint 82 may be changed to other letters and image(s) while the image 81 of the broadcast program is displayed. As other example embodiment, while the image 81 of the broadcast program is displayed, the fingerprint 82 may be discontinuously displayed and may have a displaying state where the fingerprint 82 is displayed and a non-displaying state where the fingerprint 82 is not displayed.

Figure 9:
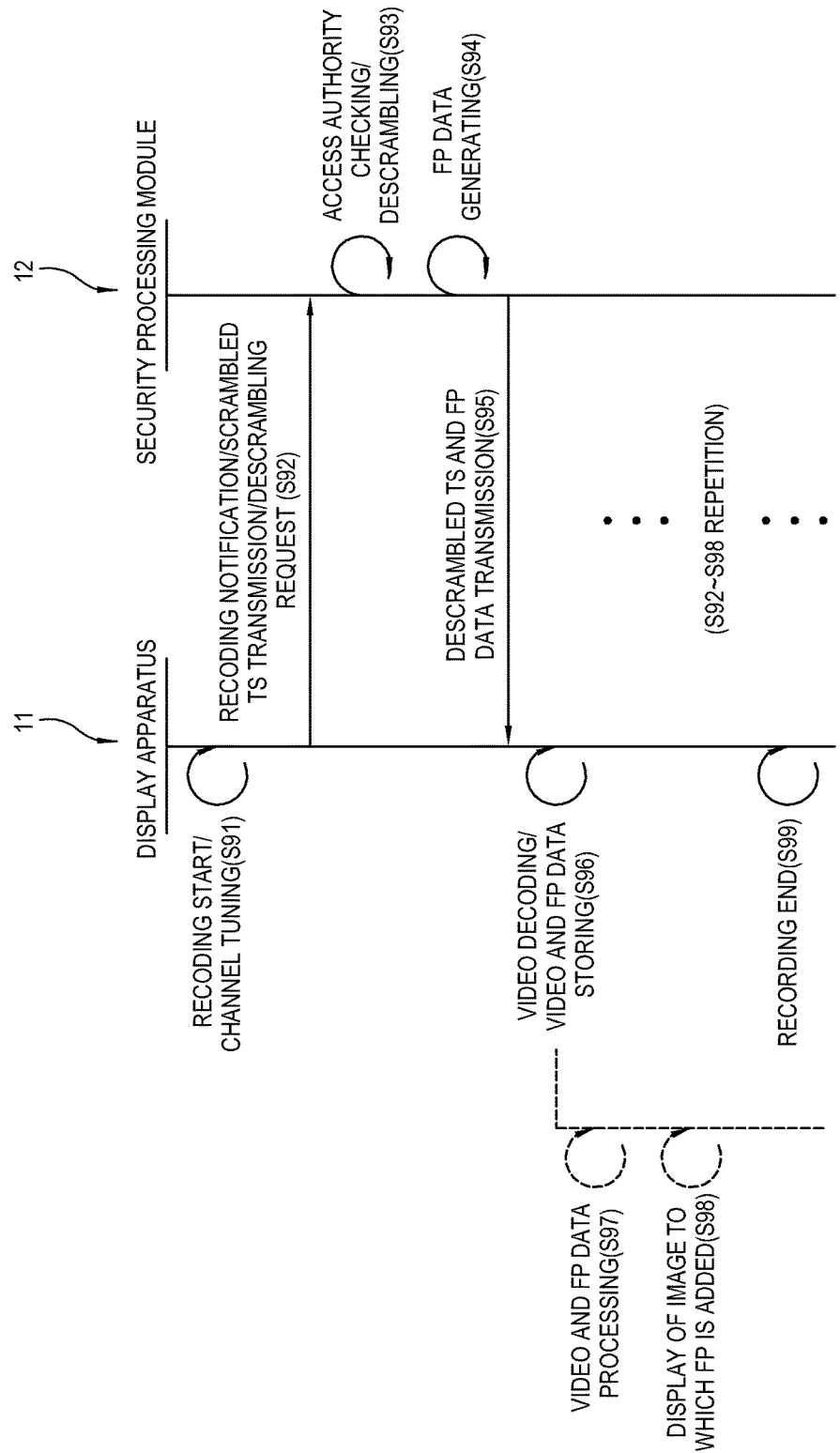
FIG. 9 is a flow diagram illustrating another example operation of a display apparatus and a security processing module according to an example embodiment.

FIG. 9 is a flow diagram illustrating another example operation of a display apparatus 11 and a security processing module 12 according to an example embodiment. The operation of the display apparatus 11 and the security processing module 12 illustrated in FIG. 9 is an example of recording content included in a broadcast signal, which is received. In the display apparatus 11 and the security processing module 12 illustrated in FIG. 9, explanations of configurations thereof, which are the same as or similar to those of the display apparatus 11 and the security processing module 12 explained with reference to FIG. 6, will be omitted.

At operation S91, the main processor 25 of the display apparatus 11 checks whether a recording event to content included in a broadcast signal, which is received, occurs.

The recording event to the content may occur, for example, based on a user input, which corresponds to a recording command received via the user input receiver 24. Also, the recording event to the content may occur when a broadcast signal of the content to which the recording is reserved is received based on a user input, which corresponds to a reserved recording command received via the user input receiver 24. If the recording event to the content occurs, the main processor 25 of the display apparatus 11 controls the signal receiver 21 to receive the broadcast signal and to tune a channel selected based on the recording command or the reserved recording command. Also, the main processor 25 controls the signal processor 22 to extract content, that is, data of a broadcast program (scrambled TS) to be recorded, from the broadcast signal of tuned channel. At operation S92, the main processor 25 controls the display 11 to transmit the scrambled TS of the broadcast program to the security processing module 12 and requests the security processing module 12 to descramble the scrambled TS transmitted to the security processing module 12. The main processor 25 may notify the security processing module 12 of that the current request is for recording the broadcast program.

At operation S93, the security processing module 12 checks whether a user has access authority to the scrambled TS of the broadcast program in response to the request from the display apparatus 11, and if the user has the access authority, descrambles the scrambled TS. At operation S94, the security processing module 12 generates fingerprint data of the broadcast program based on identification information on the display apparatus 11, the security processing module 12 and/or the received broadcast program. At operation S95, the security processing module 12 transmits the descrambled TS and the generated fingerprint data of the broadcast program to the display apparatus 11.

At operation S96, the main processor 25 of the display apparatus 11 controls the signal processor 22 to separate video data, audio data and/or additional information data from the descrambled TS of the broadcast program and to decode the video data, the audio data and/or the additional information data of the broadcast program. Also, the main processor 25 controls the signal processor 22 to receive and process fingerprint data of the broadcast program, which is decoding, from the security processing module 12. The main processor 25 stores the video data, the audio data and/or the additional information data and the fingerprint data of the broadcast program.

Referring again to FIG. 2, the display apparatus 11 may further include a storage 27, which is implemented as a nonvolatile memory, and store the video data, the audio data and/or the additional information data and the fingerprint data of the broadcast program in the storage 27. As another example embodiment, the display apparatus 11 may store the video data, the audio data and/or the additional information data and the fingerprint data of the broadcast program in an external content storage device 29. The content storage device 29 may be, for example, various electronic devices, such as a personal computer (PC), a smart phone, a smart pad and the like, as well as an exclusive storage device, such as a hard disc drive, a USB memory, or the like. The display apparatus 11 may further include a second interface 28 to communicate with the content storage device 29.

Referring again to FIG. 9, as an example embodiment, if both recording and watching the broadcast program, at operation S98 which is combined with the operation S97, the main processor 25 controls the signal processor 22 to generate an image of the broadcast program to which the fingerprint is added, based on the decoded video data and the processed fingerprint data. Also, the main processor 25 controls the display 23 to display thereon the image of the broadcast program on which the fingerprint is added, which is generated by the signal processor 22.

At operation S99, the display apparatus 11 and the security processing module 12 repeatedly perform the operations S92 to S98 and if a recording end event occurs, for example, if a user input, which corresponds to a recording end command, is received or the recording of the broadcast program is completed, end the recording operation. If the recording end event occurs, the display apparatus 11 may notify the security processing module 12 that the recording of the broadcast program is ended.

Figure 10:
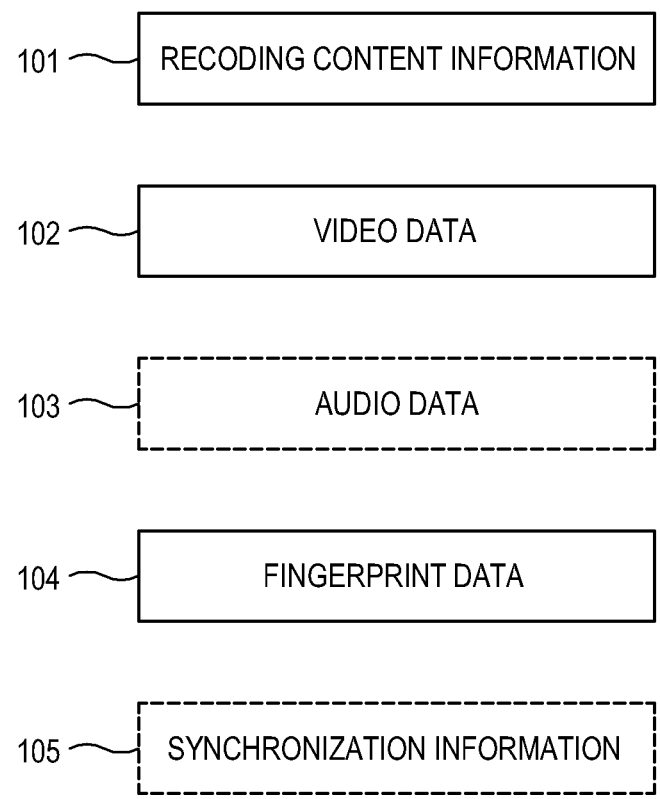
FIG. 10 is a diagram illustrating an example configuration of data, which are stored in a content recording by a display apparatus according to an example embodiment.

FIG. 10 is a diagram illustrating an example configuration of data which is stored by the display apparatus 11 during content recording according to an example embodiment. As illustrated in FIG. 10, the data, which is stored by the display apparatus 11 during the content recording, includes, for example, recording content information 101, video data 102, and fingerprint data 104. The video data 102 may be the video data decoded by the signal processor 22, as described above, and the fingerprint data 104 may be the fingerprint data which is received from the security processing module 12 or to which preset processing is performed after being received from the security processing module 12, as described above. However, the type of the video data 102 and the fingerprint data 104 stored during the content recording is not limited thereto. For instance, the video data 102 may be stored in various types, such as a type of data before being decoded and the like. The recording content information 101 according to an example embodiment as information capable of identifying stored data includes, for example, identification information on recorded broadcast program and/or channel, and information on recorded time, recording user and the like. If the recorded content further includes audio data and/or additional information data, the data stored by the display apparatus 11 during the content recording may further include audio data 103 and the like.

The data which are stored by the display apparatus 11 during the content recording according to an example embodiment may further include synchronization information 105. The synchronization information 105 according to an example embodiment is reference information for synchronizing between the video data 101 and the fingerprint data 104 during play-back of recorded content. The main processor 25 of the display apparatus 25 may control the signal processor 22 to generate the synchronization information 105 or to receive the synchronization information 105 from the security processing module 12. The signal processor 22 may generate the synchronization information 105 based on temporal corresponding relation between the video data 102 which is decoded and the fingerprint data 104 received corresponding thereto from the security processing module 12. As an example embodiment, the signal processor 22 may determine the temporal corresponding relation between the video data 102 and the fingerprint data 104 in the process of generating the image of the broadcast program to which the fingerprint is added, as explained with reference to the operation S98 illustrated in FIG. 9. As another example embodiment, even if the image of the broadcast program to which the fingerprint is added is not generated, the signal processor 22 may determine the temporal corresponding relation between the video data 102 and the fingerprint data 104 in conformity to the operation which adds the fingerprint to the image of the broadcast program.

Figure 11:
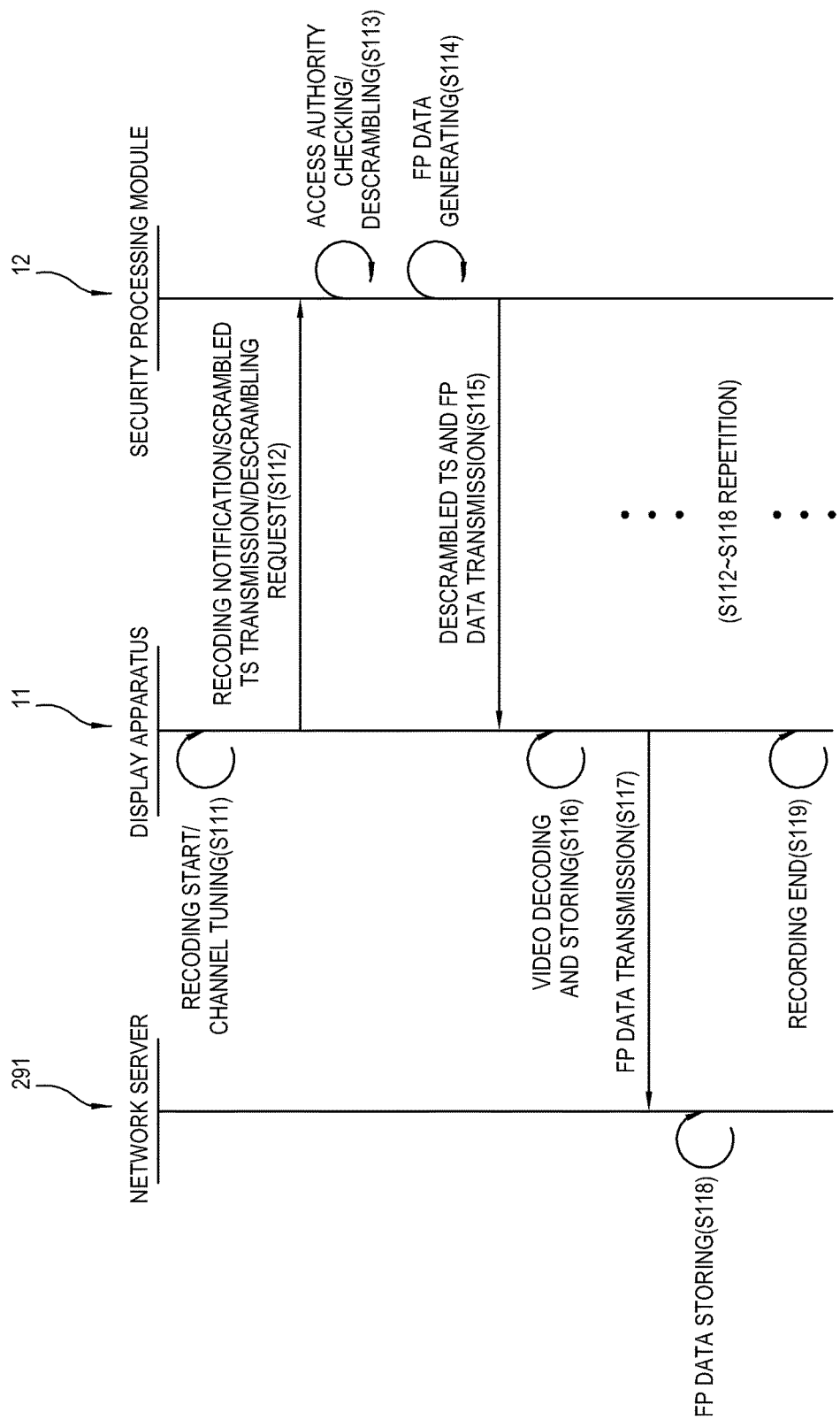
FIG. 11 is a flow diagram illustrating another example operation of a display apparatus, a security processing module and a network server according to an example embodiment.

FIG. 11 is a diagram illustrating another example operation of a display apparatus 11, a security processing module 12 and a network server 291 according to an example embodiment. The operation of the display apparatus 11, the security processing module 12 and the network server 291 as illustrated in FIG. 11, which records content included in a received broadcast signal, is an example of storing fingerprint data in the network server 291. In the display apparatus 11 and the security processing module 12 illustrated in FIG. 11, explanations of configurations thereof, which are the same as or similar to those of the display apparatus 11 and the security processing module 12 explained with reference to FIG. 9, will be omitted.

At operation S111, the main processor 25 of the display apparatus 11 checks whether a recording event to content included in a broadcast signal, which is received, occurs. If the recording event to the content occurs, the main processor 25 of the display apparatus 11 controls the signal receiver 21 to receive the broadcast signal and to tune a channel selected based on a recording command or a reserved recording command. Also, the main processor 25 controls the signal processor 22 to extract a scrambled TS of a broadcast program to be recorded, from the broadcast signal of tuned channel. At operation S112, the main processor 25 controls the display apparatus 11 to transmit the extracted scrambled TS of the broadcast program to the security processing module 12 and requests the security processing module 12 to descramble the scrambled TS transmitted to the security processing module 12.

At operation S113, the security processing module 12 checks whether a user has access authority to the received scrambled TS of the broadcast program in response to the request from the display apparatus 11, and if the user has the access authority, descrambles the scrambled TS. At operation S114, the security processing module 12 generates fingerprint data of the broadcast program based on identification information on the display apparatus 11, the security processing module 12 and/or the received broadcast program. At operation S115, the security processing module 12 transmits the descrambled TS and the generated fingerprint data of the broadcast program to the display apparatus 11.

At operation S116, the main processor 25 of the display apparatus 11 controls the signal processor 22 to separate video data and the like from the descrambled TS of the broadcast program and to decode the video data and the like of the broadcast program. The main processor 25 controls to store the video data and the like of the broadcast program in the storage 27 or the external content storage device 29.

On the other hand, the main processor 25 controls the signal processor 22 to receive fingerprint data of the broadcast program from the security processing module 12. At operation S117, the main processor 25 transmits the fingerprint data of the broadcast program to the network server 291 via the second interface 28 to store the fingerprint data in the network server 291. To identify the fingerprint data, recording content information 101 as illustrated in FIG. 10 may be also transmitted to the network server 291 and stored in the network server 291. The network server 291 may be, for example, a web server. As an example embodiment, the main processor 25 may control the signal processor 22 to generate synchronization information of the fingerprint data and transmit the synchronization information of the fingerprint data to the network server 291 via the second interface 28 to store the synchronization information of the fingerprint data in the network server 291. As another example embodiment, to increase the security, the main processor 25 may control the signal processor 22 to encrypt the fingerprint data and/or the synchronization information transmitted to the network server 291. At operation S118, the network server 291 stores the fingerprint data and/or the synchronization information received from the display apparatus 11.

At operation S119, the display apparatus 11, the security processing module 12 and the network server 291 repeatedly perform the operations S112 to S118 and if a recording end event occurs, for example, if a user input, which corresponds to a recording end command, is received or the recording of the broadcast program is completed, end the recording operation.

Figure 12:
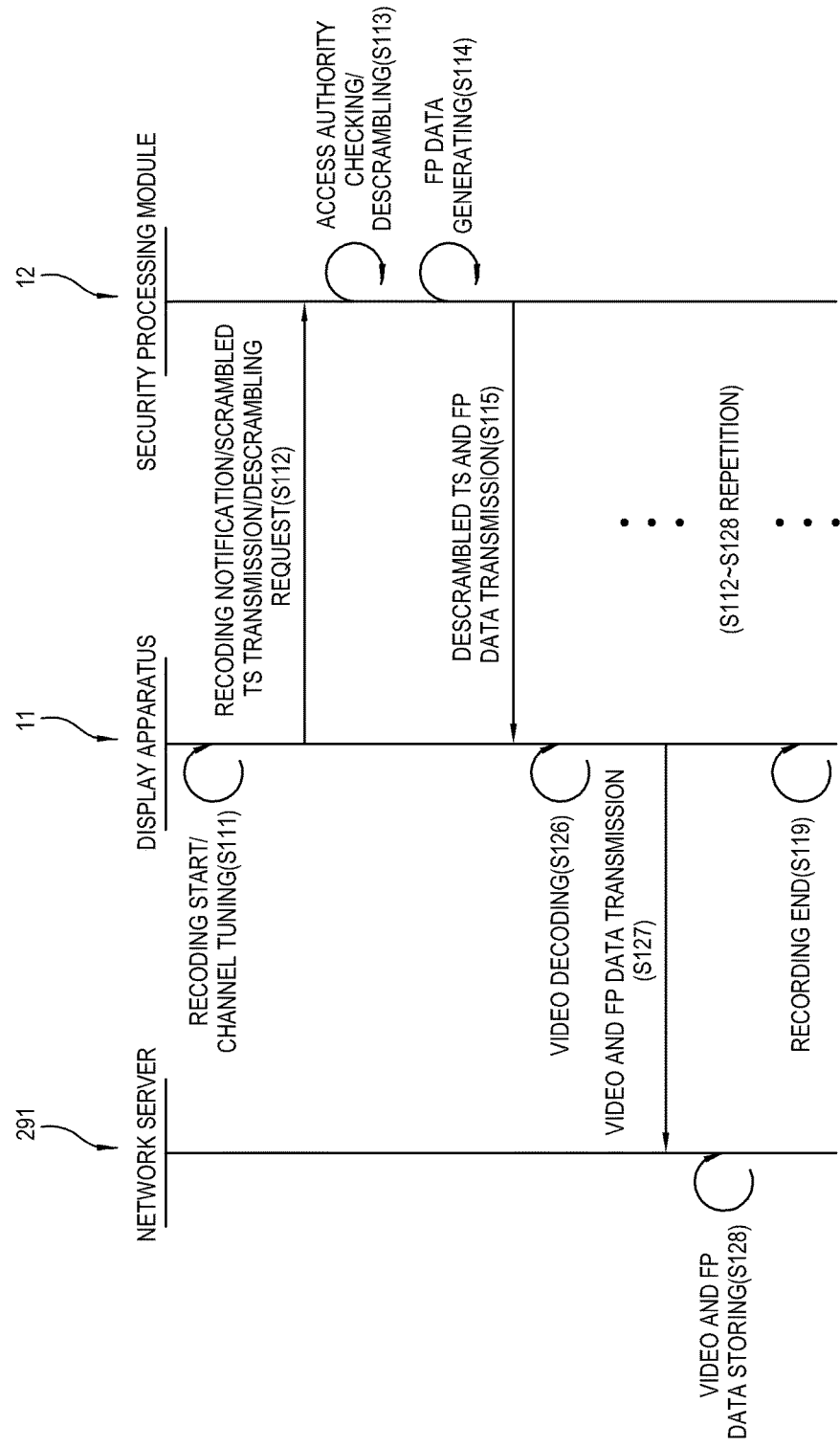
FIG. 12 is a flow diagram illustrating a further example operation of a display apparatus, a security processing module and a network server according to an example embodiment.

FIG. 12 is a flow diagram illustrating another example operation of a display apparatus 11, a security processing module 12 and a network server 291 according to an example embodiment. The operation of the display apparatus 11, the security processing module 12 and the network server 291 as illustrated in FIG. 12, which records content included in a received broadcast signal, is an example of storing video data and fingerprint data of the content in the network server 291. In the display apparatus 11, the security processing module 12 and the network server 291 illustrated in FIG. 12, explanations of configurations thereof, which are the same as or similar to those of the display apparatus 11, the security processing module 12 and the network server 291 explained with reference to FIG. 11, will be omitted.

Operations S111 to S115 and S119 illustrated in FIG. 12, operations of the display apparatus 11 and the security processing module 12 are the same as or similar to those of the display apparatus 11 and the security processing module 12 explained with reference to FIG. 11. At operation S126, the main processor 25 of the display apparatus 11 controls the signal processor 22 to separate video data and the like from a descrambled TS of a broadcast program and to decode the video data and the like of the broadcast program. Also, the main processor 25 controls the signal processor 22 to receive fingerprint data of the broadcast program from the security processing module 12.

At operation S127, the main processor 25 transmits the video data and the like and the fingerprint data of the broadcast program to the network server 291 via the second interface 28 to store the video data and the like and the fingerprint data of the broadcast program in the network server 291. At operation S118, the network server 291 stores the video data and the like and the fingerprint data of the broadcast program received from the display apparatus 11. As an example embodiment, synchronization information of the fingerprint data may be also transmitted to the network server 291 to store therein.

Figure 13:
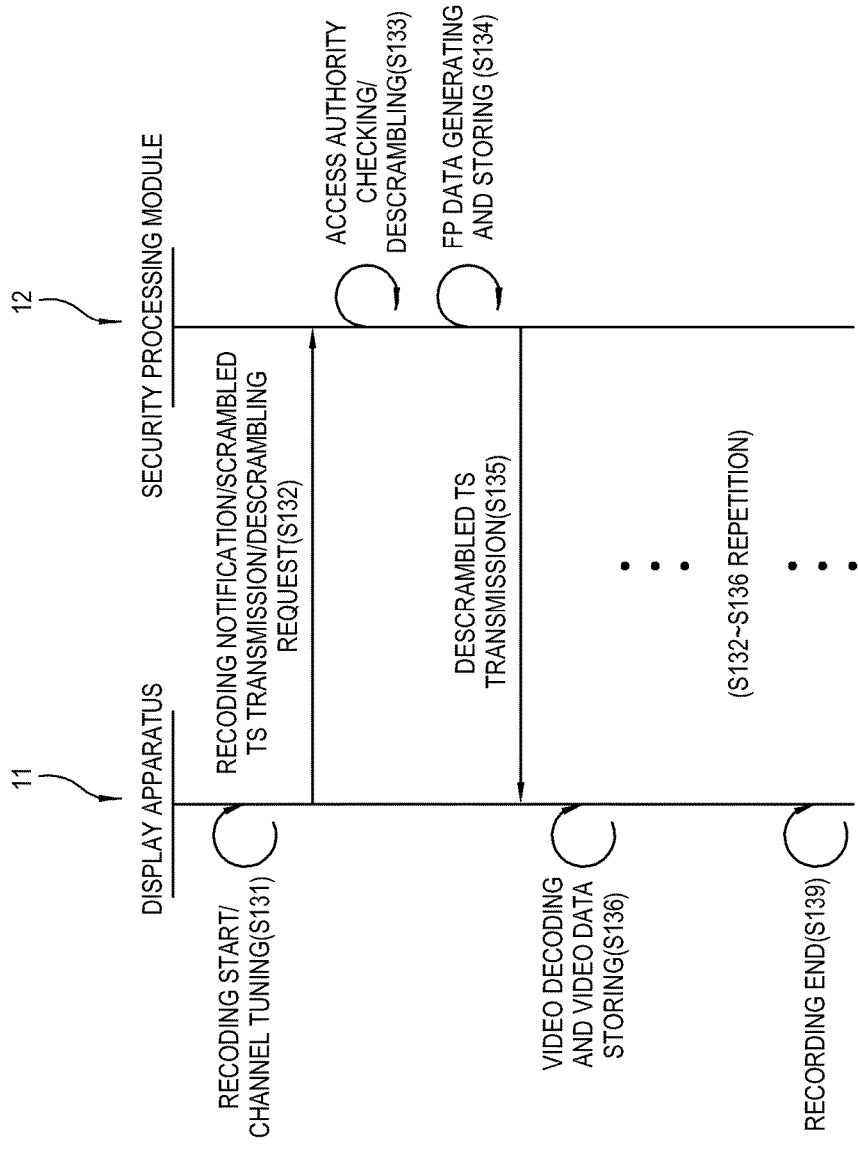
FIG. 13 is a flow diagram illustrating another example operation of a display apparatus and a security processing module according to an example embodiment.

FIG. 13 is a flow diagram illustrating another example operation of a display apparatus 11 and a security processing module 12 according to an example embodiment. The operation of the display apparatus 11 and the security processing module 12 as illustrated in FIG. 13, which records a content included in a received broadcast signal, is an example of storing fingerprint data of the content in the security processing module 12. In the display apparatus 11 and the security processing module 12 illustrated in FIG. 13, explanations of configurations thereof, which are the same as or similar to those of the display apparatus 11 and the security processing module 12 explained with reference to FIG. 9, will be omitted.

At operations S131 to S133 illustrated in FIG. 13, the display apparatus 11 and the security processing module 12 may be operated the same as or similar to the operations S91 to S93 of the display apparatus 11 and the security processing module 12 explained with reference to FIG. 9. At operation S134, the security processing module 12 generates fingerprint data of a broadcast program based on identification information on the display apparatus 11, the security processing module 12 and/or the received broadcast program, and stores the generated fingerprint data. As an example embodiment, the security processing module 12 may further include a module storage 491, which is a nonvolatile memory, as illustrated in FIG. 4, and store the generated fingerprint data in the module storage 491. As another example embodiment, the security processing module 12 may generate synchronization information of the fingerprint data to an image of the broadcast information and store the generated synchronization information along with the fingerprint data. At operation S135, the security processing module 12 transmits descrambled TD of the broadcast program to the display apparatus 11. At operations S136 to S139 illustrated in FIG. 13, the display apparatus 11 may be operated the same as or similar to the operations S96 to S99 of the display apparatus 11 explained with reference to FIG. 9.

Figure 14:
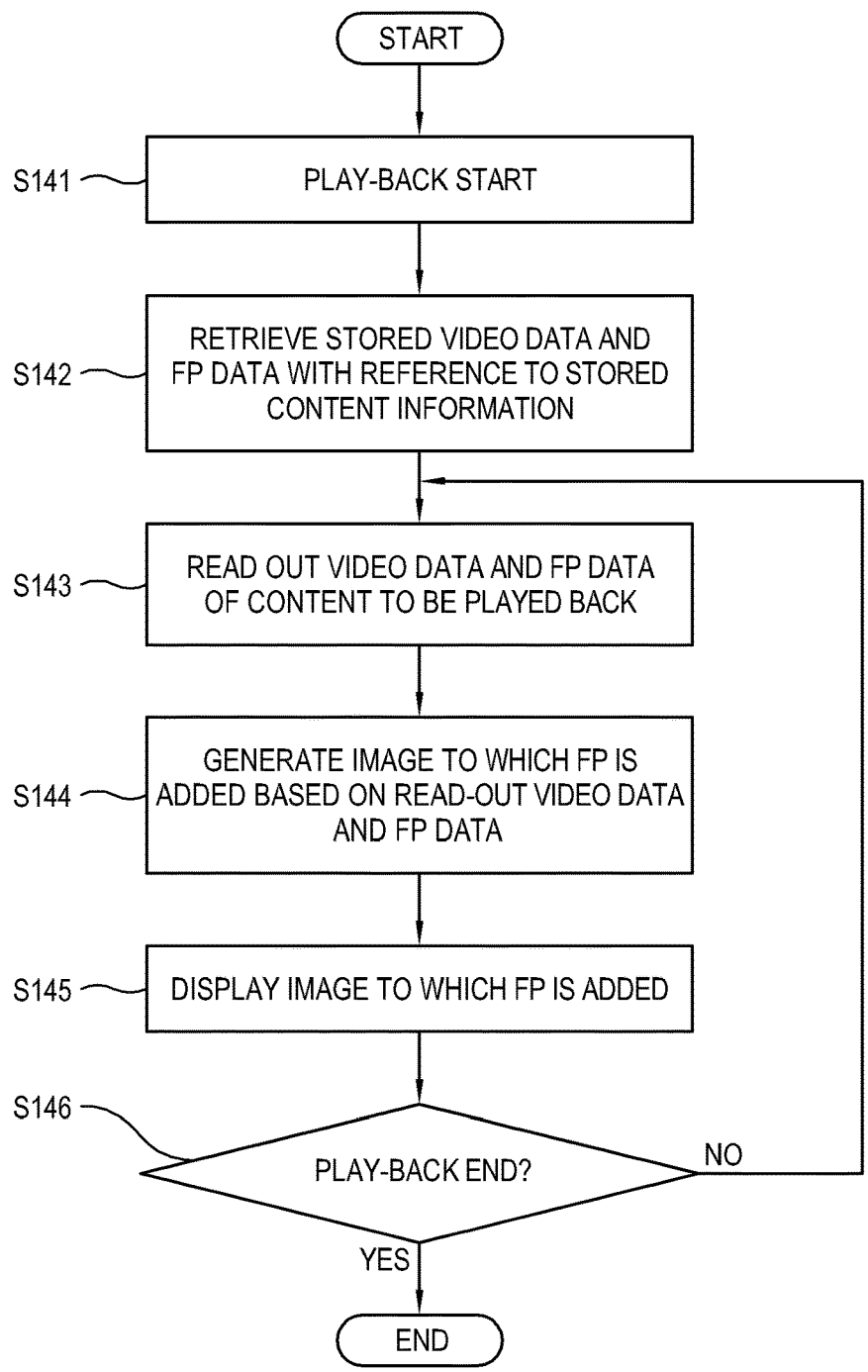
FIG. 14 is a flowchart another example operation of a display apparatus according to an example embodiment.

FIG. 14 is a flowchart illustrating another example operation of a display apparatus 11 according to an example embodiment. The operation of the display apparatus 11 in FIG. 14 is an example of playing back recorded content. At operation S141, the main processor 25 of the display apparatus 11 checks whether a play-back event to the recorded content occurs, and if the play-back event to the recorded content occurs, begins to play back the recorded content. The play-back event to the recorded content may be determined as occurring based on a user input, which corresponds to a play-back command received via the user input receiver 24. The main processor 25 of the display apparatus 11 may notify a security processing module 12 of beginning to play back the recorded content, if the play-back event to the recorded content occurs.

At operation S142, if beginning to play back the recorded content, the main processor 25 of the display apparatus 11 retrieves video data 102 and fingerprint data 104 of the content requested to play back, for example, with reference to stored recording content information 101, as illustrated in FIG. 10. The main processor 25 may retrieve video data 102 and fingerprint data 104 of the content, which are stored in the storage 27 or the external storage device 28. At operation S143, if the retrieval is completed, the main processor 25 controls to read out the video data 102 and the fingerprint data 104 of the content to be played back from the storage 27 or the external storage device 28. At operation S144, the main processor 25 controls the signal processor 22 to generate an image of the content to which a fingerprint is added based on the video data 102 and the fingerprint data 104, which are read out. At operation S145, the main processor 25 controls the display 24 to display thereon the image of the content to which the fingerprint is added, which is generated by the signal processor 22. At operation S146, the main processor 25 checks whether a play-back end event to the recorded content occurs, and if it is determined that the play-back end event does not occur, repeatedly performs the operations S143 to S146 and if it is determined that the play-back end event has occurred, ends the play back operation. The play-back end event to the recorded content may be, for example, receiving a user input directing to end the play back of the recorded content or the play back of the recorded content being completed. If the recording end event occurs, the display apparatus 11 may notify the security processing module 12 that the play back of the recorded content is ended.

Figure 15:
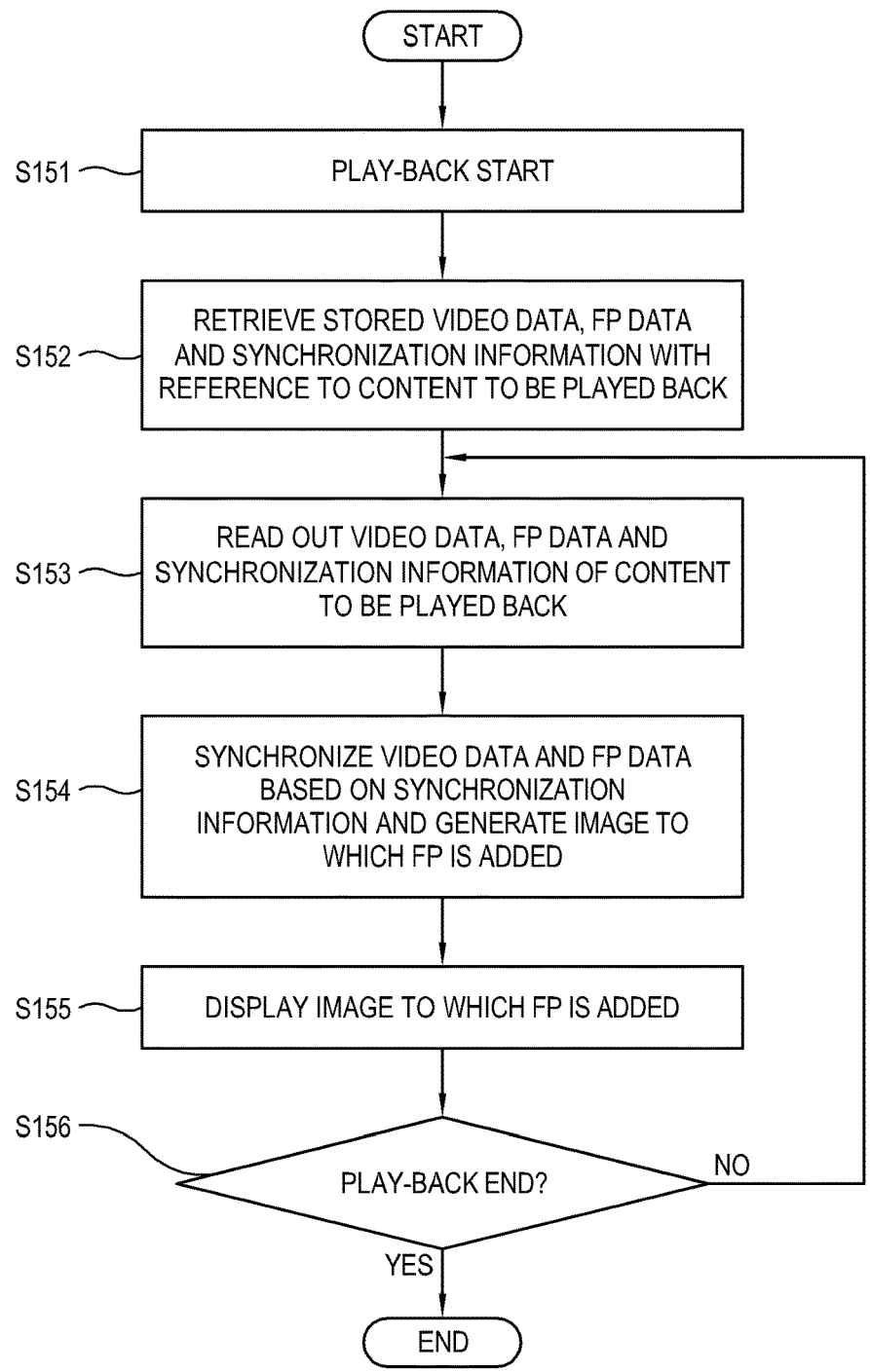
FIG. 15 is a flowchart illustrating an example of playing back a recorded content by a display apparatus according to an example embodiment.

FIG. 15 is a flowchart illustrating an example of playing back a recorded content by a display apparatus 11 according to an example embodiment. In the display apparatus 11 as illustrated in FIG. 15, explanations of configurations thereof, which are the same as or similar to those of the display apparatus 11 as illustrated in FIG. 14, will be omitted. At operation S151, the main processor 25 of the display apparatus 11 begins to play back recorded content if it is determined that a play-back event to the recorded content has occurred. At operation S152, the main processor 25 of the display apparatus 11 retrieves video data 102, fingerprint data 104 and synchronization information 105 of the content requested to play back. At operation S153, the main processor 25 controls to read out the video data 102, the fingerprint data 104 and the synchronization information 105 of the content to be played back from the storage 27 or the external storage device 28. At operation S154, the main processor 25 controls the signal processor 22 to generate an image of the content to which a fingerprint is added based on the video data 102, the fingerprint data 104 and the synchronization information 105, which are read out. The signal processor 22 synchronizes the video data 102 and the fingerprint data 104 each other based on the synchronization information 105. At operations S155 to 156, the display apparatus 11 may be operated the same as or similar to the operations S145 to S146 of the display apparatus 11 as illustrated in FIG. 14.

Figure 16:
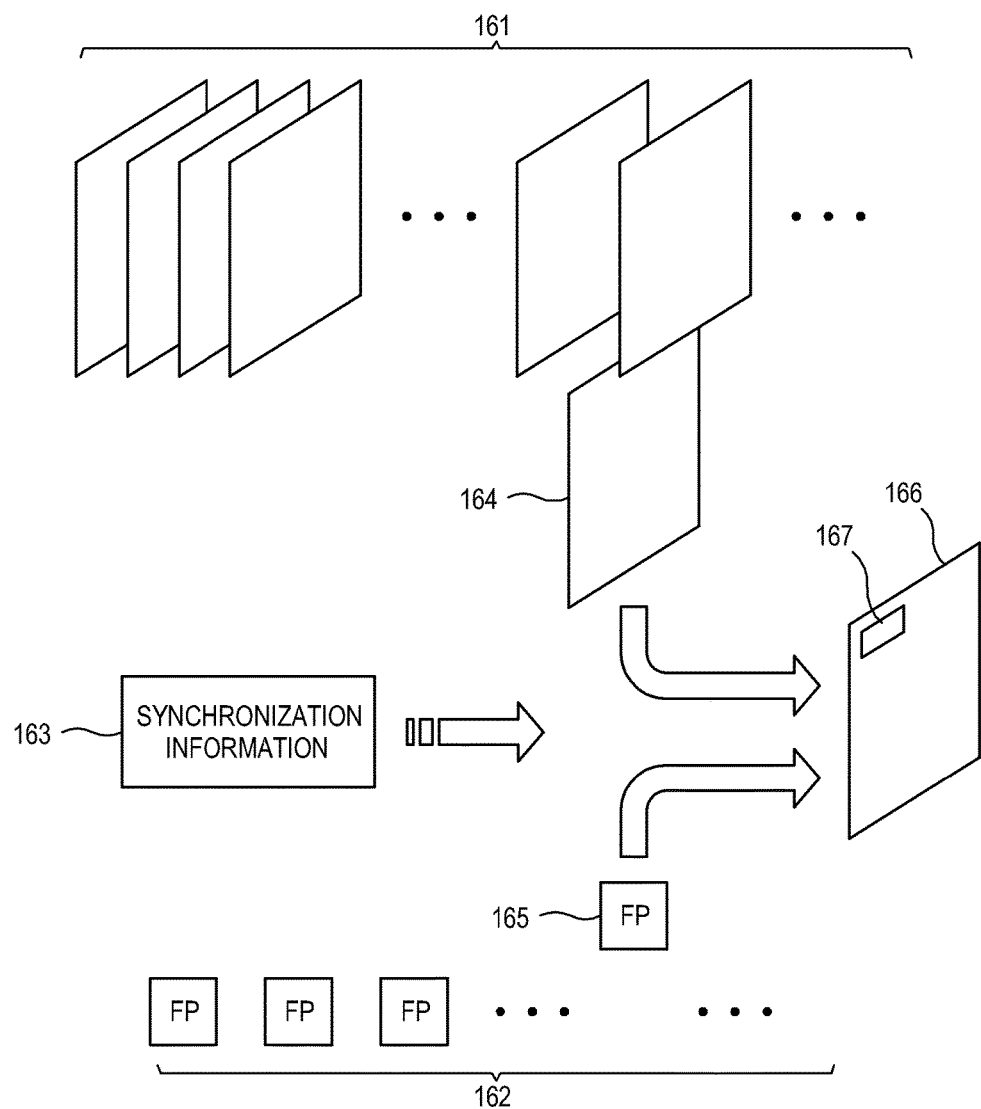
FIG. 16 is a diagram illustrating an example of synchronizing video data and fingerprint data by a display apparatus according to an example embodiment.

FIG. 16 is a diagram illustrating an example of synchronizing video data and fingerprint data each other by a display apparatus 11 according to an example embodiment. The signal processor 22 of the display apparatus 11 synchronizes fingerprint data 162 with video data, which is processed by a series of frames 161 and adds a fingerprint 167 to an image 166 of content. For example, the signal processor 22 selects fingerprint data 165 corresponding to a currently processed frame 164 from among a plurality of frames 161 with reference to synchronization information 163, and adds the fingerprint 167 based on the selected fingerprint data 165 to the image 166 of the currently processed frame 164. The synchronization information 163 according to an example embodiment may include, for example, timing information, such as a so-called "time stamp", which represents a point of time that each fingerprint based on the fingerprint data 162 is displayed from among an entire play-back time of corresponding content. The signal processor 22 may select the fingerprint data 165 for the fingerprint 167 to be displayed corresponding to a play-back time of the currently processed frame 164 from among the plurality of frames 161, with reference to synchronization information 163.

Figure 17:
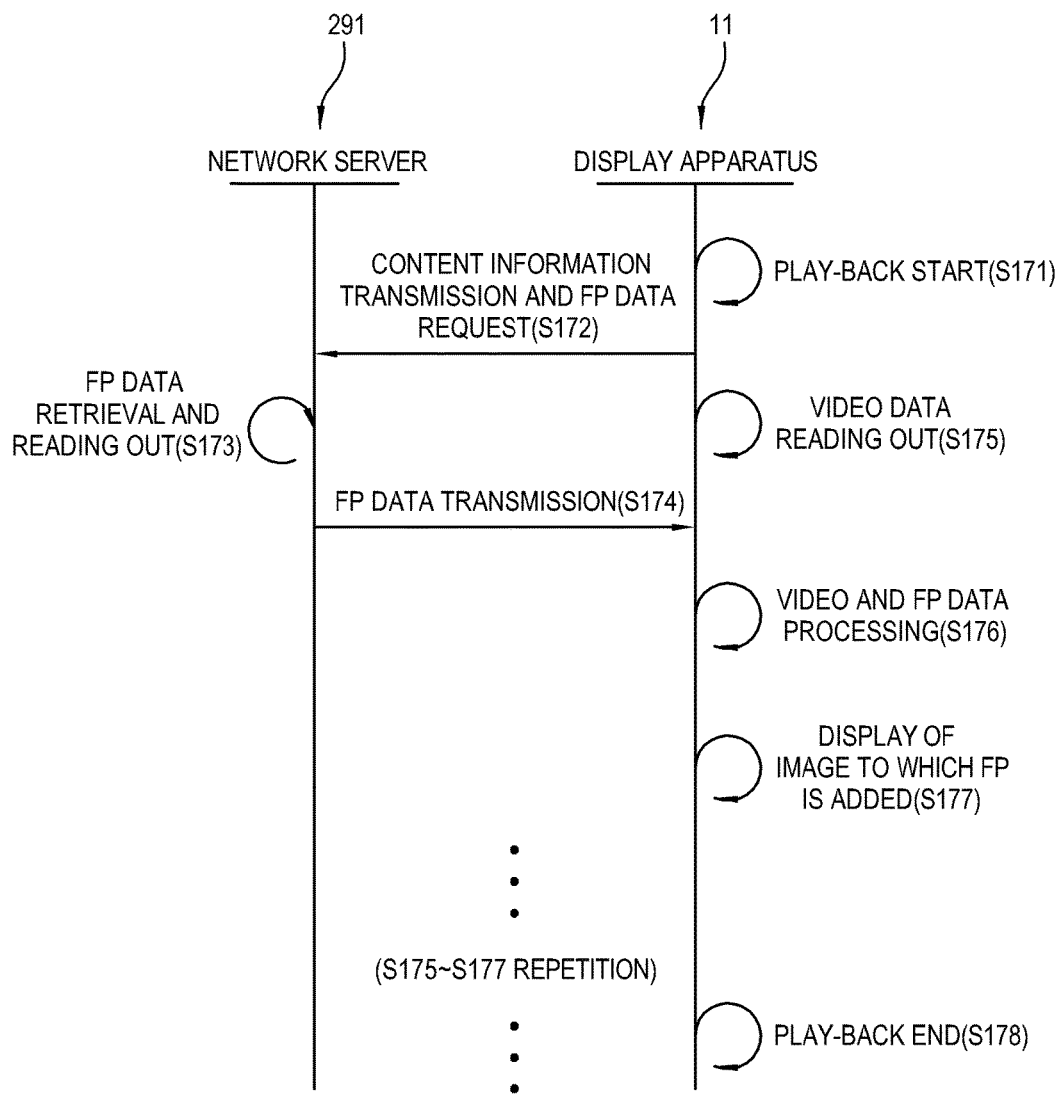
FIG. 17 is a flow diagram illustrating another example operation of a display apparatus and a network server according to an example embodiment.

FIG. 17 is a flow diagram illustrating another example operation of a display apparatus 11 and a network server 291 according to an example embodiment. The operation of the display apparatus 11 and the network server 291 illustrated in FIG. 17 is an example of playing back recorded content when fingerprint data is stored in the network server 291. In the display apparatus 11 as illustrated in FIG. 17, explanations of configurations thereof, which are to the same as or similar to those of the display apparatus 11 as illustrated in FIGS. 14 and 15, will be omitted. At operation S171, if it is determined that play-back event to the recorded content has occurred, the main processor 25 of the display apparatus 11 begins to play back the recorded content. At operation S172, the main processor 25 transmits recording content information capable of identifying the recorded content requested to play back, to the network server 291 and requests the network server 291 fingerprint data of the recorded content requested to play back. At operation S173, the network server 291 retrieves the fingerprint data of the recorded content requested to play back in response to the request from the display apparatus 11. At operation S174, if the fingerprint data of the recorded content requested to play back is retrieved, the network server 291 reads out the retrieved fingerprint data and transmits the read-out fingerprint data to the display apparatus 11.

At operation S175, the main processor 25 of the display apparatus 11 reads out video data of the recorded content to be played back from the storage 27 or the external storage device 28. At operation S176, the main processor 25 controls the signal processor 22 to generate an image of the recorded content to which a fingerprint is added, based on the read-out video data and the fingerprint data received from the network server 291. As an example embodiment, the signal processor 22 may synchronize the video data and the fingerprint data each other based on synchronization information stored in advance. As another example embodiment, if the fingerprint data received from the network server 291 is encrypted to increase security, the signal processor 22 may decrypt the received fingerprint data. At operation S177, the main processor 25 controls the display 24 to display thereon an image of the content to which the fingerprint is added, which is generated by the signal processor 22. At operation S178, the main processor 25 repeatedly performs the operations S175 to S177 if it is determined that a play-back end event does not occur, and ends the play back operation if it is determined that the play-back end event has occurred.

Figure 18:
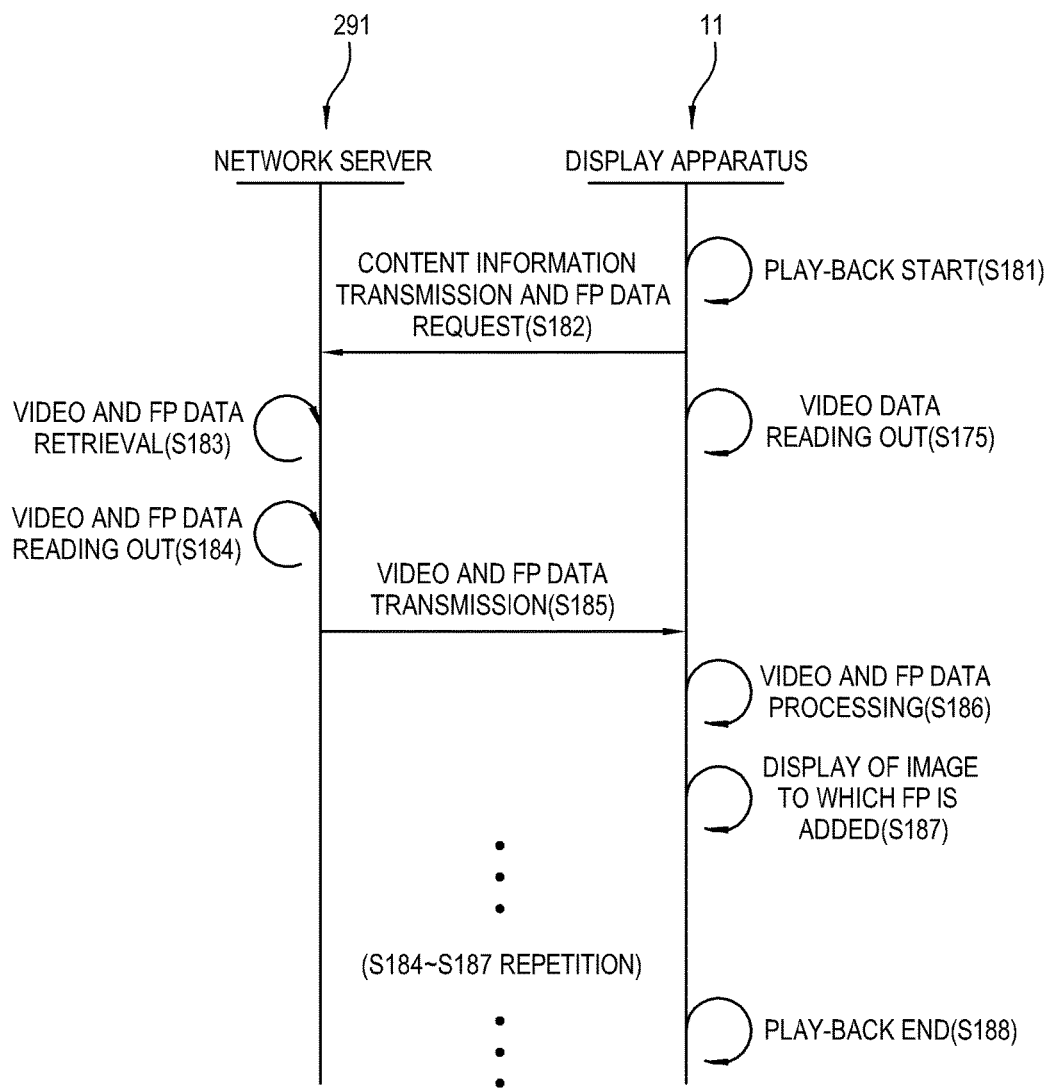
FIG. 18 is a flow diagram illustrating another example operation of a display apparatus and a network server according to an example embodiment.

FIG. 18 is a flow diagram illustrating another example operation of a display apparatus 11 and a network server 291 according to an example embodiment. The operation of the display apparatus 11 and the network server 291 illustrated in FIG. 18 is an example of playing back recorded content when video data and fingerprint data of the recorded content are stored in the network server 291. In the display apparatus 11 and the network server 291 as illustrated in FIG. 18, explanations of configurations thereof, which are the same as or similar to those of the display apparatus 11 and the network server 291 as illustrated in FIG. 17, will be omitted. At operation S181, if it is determined that a play-back event to the recorded content has occurred, the main processor 25 of the display apparatus 11 begins to play back the recorded content. At operation S182, the main processor 25 transmits recording content information capable of identifying the recorded content requested to play back, to the network server 291 and requests the network server 291 video data and fingerprint data of the recorded content requested to play back. At operation S183, the network server 291 retrieves the video data and the fingerprint data of the recorded content requested to play back in response to the request from the display apparatus 11. At operation S184, if the video data and the fingerprint data of the recorded content requested to play back is retrieved, the network server 291 reads out the retrieved video data and the retrieved fingerprint data. At operation S185, the network server 291 transmits the read-out video data and the read-out fingerprint data to the display apparatus 11.

At operation S186, the main processor 25 of the display apparatus 11 controls the signal processor 22 to generate an image of the recorded content to which a fingerprint is added, based on the video data and the fingerprint data received from the network server 291. As an example embodiment, the signal processor 22 may synchronize the video data and the fingerprint data each other based on synchronization information. The synchronization information may be stored in the storage 27 of the display apparatus 11 in advance or received from the network server 291. At operation S187, the main processor 25 controls the display 24 to display thereon the image of the content to which the fingerprint is added, which is generated by the signal processor 22. At operation S188, the main processor 25 repeatedly performs the operations S184 to S187 if it is determined that a play-back end event does not occur, and ends the play back operation if it is determined that the play-back end event has occurred.

Figure 19:
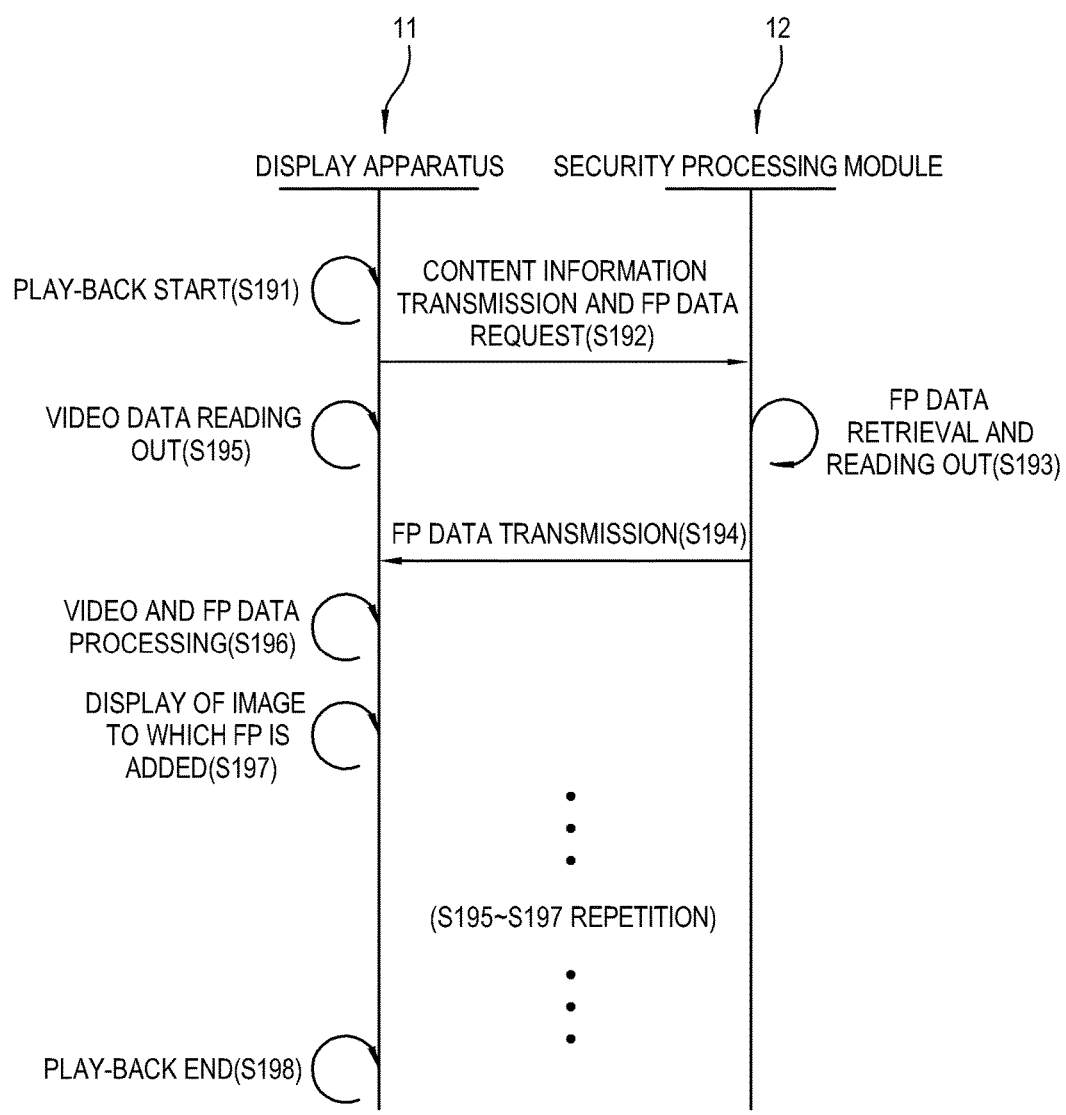
FIG. 19 is a flow diagram illustrating another example operation of a display apparatus and a security processing module according to an example embodiment.

FIG. 19 is a flow diagram illustrating another example operation of a display apparatus 11 and a security processing module 12 according to an example embodiment. The operation of the display apparatus 11 and the security processing module 12 illustrated in FIG. 19 is an example of playing back recorded content when fingerprint data of the recorded content is stored in the security processing module 12. In the display apparatus 11 illustrated in FIG. 19, explanations of configurations thereof, which are the same as or similar to those of the display apparatus 11 illustrated in FIGS. 14 and 15, will be omitted. At operation S191, if it is determined that a play-back event to the recorded content has occurred, the main processor 25 of the display apparatus 11 begins to play back the recorded content. At operation S192, the main processor 25 transmits recording content information capable of identifying the recorded content requested to play back, to the security processing module 12 and requests the security processing module 12 fingerprint data of the recorded content requested to play back. At operation S193, the security processing module 12 retrieves the fingerprint data of the recorded content requested to play back at the module storage 491 in response to the request from the display apparatus 11. At operation S194, if the fingerprint data of the recorded content requested to play back is retrieved, the security processing module 12 reads out the retrieved fingerprint data from the module storage 491 and transmits the read-out fingerprint data to the display apparatus 11.

At operation S195, the main processor 25 of the display apparatus 11 reads out video data of the recorded content to be played back from the storage 27 or the external storage device 28. At operation S196, the main processor 25 controls the signal processor 22 to generate an image of the recorded content to which a fingerprint is added, based on the read-out video data and the fingerprint data received from the security processing module 12. As an example embodiment, the signal processor 22 may synchronize the video data and the fingerprint data each other based on synchronization information stored in advance. At operation S197, the main processor 25 controls the display 24 to display thereon the image of the content to which the fingerprint is added, which is generated by the signal processor 22. At operation S198, the main processor 25 repeatedly performs the operations S195 to S197 if it is determined that a play-back end event does not occur, and ends the play back operation if it is determined that the play-back end event has occurred.

Figure 20:
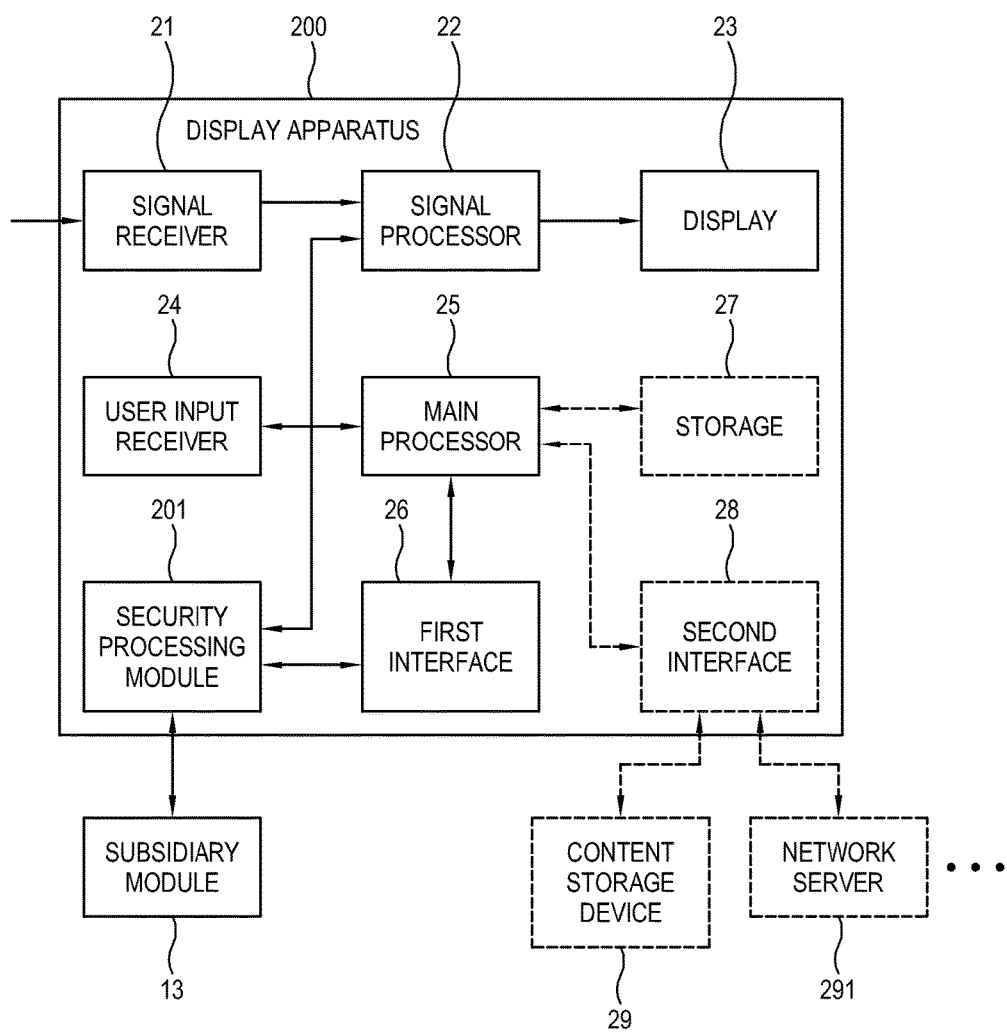
FIG. 20 is a block diagram illustrating an example configuration of a display apparatus according to another example embodiment.

FIG. 20 is a block diagram illustrating an example configuration of a display apparatus 200 according to another example embodiment. In the display apparatus 200 illustrated in FIG. 20, explanations of configurations thereof, which are the same as or similar to those of the display apparatus 11 as illustrated in FIGS. 1 to 19, will be omitted. As illustrated in FIG. 20, the display apparatus 200 according to an example embodiment may include a signal receiver 21, a signal processor 22, a display 23, a user input receiver 24, a first interface 26, and a main processor 25. The display apparatus 200 may further include a storage 27 and a second interface 28. Also, the display apparatus 200 according to an example embodiment may further include a security processing module 201. The security processing module 201 has a configuration which is basically equal or similar to that of the security processing module 12 explained with reference to FIGS. 1 to 19. The security processing module 201 according to an example embodiment is implemented as being embedded in the display apparatus 200. The security processing module 201 may be implemented by a hardware, a software, or a combination of the hardware and the software. If at least a portion of the security processing module 201 is implemented by the software, it may share at least one microprocessor with the signal processor 22 or the main processor 25.

While the example embodiments have been illustrated and described with reference to various example embodiments thereof, it will be understood by those skilled in the art that various changes in form and details may be made therein without departing from the spirit and scope of the present disclosure as defined by the appended claims and their equivalents. For instance, although the example embodiments have been explained as receiving the data of the content via the broadcast signal, the display apparatus according to other example embodiments may receive the data of the content to which the security is applied, from various types of external devices according to different transmission methods, which are not broadcasting.

What is claimed is:

1. A display apparatus comprising:
a non-transitory storage configured to store data;
a signal receiver configured to receive a data signal including content;
a display configured to display an image;
an interface comprising interface circuitry configured to communicate with a security processing module comprising security processing circuitry configured to determine whether to enable access to the content; and
a processor configured:
to transmit first data of the content to the security processing module, wherein the security processing module processes the first data of the content to obtain second data of the content;
to receive the second data of the content from the security processing module;
in response to a recording event with respect to the content,
to store the second data received from the security processing module in the storage, and
to transmit information corresponding to the recording event to the security processing module to cause the security processing module to store a security identifier of the content; and
in response to a play-back event with respect to the content stored in the storage,
to transmit information for identifying the content to be played back to the security processing module to receive the security identifier of the content from the security processing module,
to receive the security identifier of the content from the security processing module, and
to display an image of the content to which the security identifier is added based on the stored second data and the received security identifier of the content.

2. The apparatus according to claim 1,
wherein the signal receiver is configured to receive a broadcast signal comprising data of the content, and
wherein the processor is configured to extract the first data of the content from the broadcast signal.

3. The apparatus according to claim 1, wherein the processor is further configured to store synchronization information relating to synchronization between the content and the security identifier and to synchronize the security identifier with the image of the content based the stored synchronization information.

4. A method of controlling a display apparatus comprising:
receiving a data signal including content;
transmitting first data of the content to a security processing module configured to determine whether to enable access to the content, wherein the security processing module processes the first data of the content to obtain second data of the content;
receiving the second data of the content from the security processing module;
in response to a recording event with respect to the content,
  storing the second data received from the security processing module in a non-transitory storage, and
  transmitting information corresponding to the recording event to the security processing module to cause the security processing module to store a security identifier of the content; and
in response to a play-back event with respect to the content stored in the storage,
  transmitting information for identifying the content to be played-back to the security processing module to receive the security identifier of the content from the security processing module,
  receiving the security identifier of the content from the security processing module, and
  displaying an image of the content to which the security identifier is added based on the stored second data and the received security identifier of the content.

5. The method according to claim 4,
wherein receiving the data of the content comprises receiving a broadcast signal comprising the data of the content,
wherein the transmitting of the first data comprises extracting the first data of the content from the broadcast signal and transmitting the extracted first data of the content to the security processing module.

6. The method according to claim 4, further comprising:
storing synchronization information relating to synchronization between the content and the security identifier;
wherein the displaying comprises synchronizing the security identifier with the image of the content based the stored synchronization information.

7. A display apparatus comprising:
a non-transitory storage configured to store data;
a signal receiver configured to receive a data signal including content;
a display configured to display an image;
an interface comprising interface circuitry configured to communicate with a security processing module comprising security processing circuitry configured to determine whether to enable access to the content; and
a processor configured:
  to transmit first data of the content to the security processing module, wherein the security processing module processes the first data of the content to obtain second data of the content;
  to receive the second data of the content from the security processing module and to store the received second data of the content in the storage; and
  in response to a play-back event with respect to the content stored in the storage,
    to transmit information for identifying the content to be played back to the security processing module to receive a security identifier of the content from the security processing module,
    to receive the security identifier of the content from the security processing module, and
    to display an image of the content to which the security identifier is added based on the stored second data and the received security identifier.

8. The apparatus according to claim 7,
wherein the signal receiver is configured to receive a broadcast signal comprising the data of the content, and
wherein the processor is configured to extract the first data of the content from the broadcast signal.

9. The apparatus according to claim 7, wherein the processor is configured to synchronize the security identifier with the image of the content based synchronization information relating to synchronization between the content and the security identifier.

10. The apparatus according to claim 9, wherein processor is configured to receive the synchronization information from the security processing module.

11. A method of controlling a display apparatus comprising:
receiving a data signal including content;
transmitting first data of the content to a security processing module, which determines whether to enable access to the content, wherein the security processing module processes the first data of the content to obtain second data of the content;
receiving the second data of the content from the security processing module;
storing the received second data of the content in a non-transitory storage; and
in response to a play-back event with respect to the content stored in the storage,
  transmitting information for identifying the content to be played back to the security processing module to receive a security identifier of the content from the security processing module,
  receiving the security identifier of the content from the security processing module, and
  displaying an image of the content to which the security identifier is added based on the stored second data and the received security identifier.

12. The method according to claim 11,
wherein the receiving the data of the content comprises receiving a broadcast signal comprising the data of the content, and
wherein the transmitting of the first data comprises extracting the first data of the content from the broadcast signal and transmitting the extracted first data of the content to the security processing module.

13. The method according to claim 11, wherein the displaying comprises synchronizing the security identifier with the image of the content based synchronization information relating to synchronization between the content and the security identifier.

14. The method according to claim 13, wherein the displaying further comprises receiving the synchronization information from the security processing module.

\* \* \* \* \*